(12) United States Patent
Zhang

(10) Patent No.: US 11,015,936 B2
(45) Date of Patent: May 25, 2021

(54) POSITIONING METHOD AND DEVICE

(71) Applicant: Huawei Technologies Co., Ltd., Shenzhen (CN)

(72) Inventor: Xiaoping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 504 days.

(21) Appl. No.: 15/771,770

(22) PCT Filed: Oct. 20, 2016

(86) PCT No.: PCT/CN2016/102767
§ 371 (c)(1),
(2) Date: Apr. 27, 2018

(87) PCT Pub. No.: WO2017/084468
PCT Pub. Date: May 26, 2017

(65) Prior Publication Data
US 2018/0340777 A1    Nov. 29, 2018

(30) Foreign Application Priority Data
Nov. 16, 2015    (CN) .......................... 201510788507.2

(51) Int. Cl.
*G01C 21/16* (2006.01)
*G01S 5/02* (2010.01)
(Continued)

(52) U.S. Cl.
CPC .......... *G01C 21/165* (2013.01); *G01C 21/20* (2013.01); *G01S 5/02* (2013.01); *G01S 5/0263* (2013.01);
(Continued)

(58) Field of Classification Search
None
See application file for complete search history.

(56) References Cited

U.S. PATENT DOCUMENTS 7,397,424 B2     7/2008  Houri
9,504,425 B2 *  11/2016  Jooste ............... G08B 21/0288
(Continued)

FOREIGN PATENT DOCUMENTS

CN        1576877 A     2/2005
CN      101094024 A    12/2007
(Continued)

OTHER PUBLICATIONS

X. Guo, Z. Song, J. Ma, Y. Xiong, Y. Jie and W. Wang, "An inter-device positioning method based on inertial sensors and wireless signal strength," 2013 3rd International Conference on Consumer Electronics, Communications and Networks, Xianning, 2013, pp. 121-124, doi: 10.1109/CECNet.2013.6703287. (Year: 2013).*

(Continued)

*Primary Examiner* — Gregory J Toatley, Jr.
*Assistant Examiner* — Terence E Stifter, Jr.
(74) *Attorney, Agent, or Firm* — Conley Rose, P.C.

(57) ABSTRACT

A method includes obtaining a moving track shape of a second device that is presented before and after a wireless communication connection between the second device and the first device is broken, and a moving track of the second device presented before the wireless communication coupling between the second device and the first device is broken, and matching the moving track shape of the second device presented before and after the wireless communication connection between the second device and the first device is broken and the moving track of the second device presented before the wireless communication connection between the second device and the first device is broken to determine a moving track of the second device presented after the wireless communication connection between the second device and the first device is broken.

20 Claims, 20 Drawing Sheets

(51) Int. Cl.
*H04W 64/00* (2009.01)
*G01C 21/20* (2006.01)
*G01S 11/06* (2006.01)

(52) U.S. Cl.
CPC .......... *G01S 5/0284* (2013.01); *H04W 64/00* (2013.01); *G01S 11/06* (2013.01)

(56) References Cited

U.S. PATENT DOCUMENTS

| | | |
|---|---|---|
| 2004/0029558 A1 | 2/2004 | Liu |
| 2009/0201149 A1 | 8/2009 | Kaji |
| 2011/0270519 A1 | 11/2011 | Park et al. |
| 2013/0258881 A1 | 10/2013 | Li |
| 2013/0337849 A1* | 12/2013 | Wan .................... H04W 40/244 455/456.6 |
| 2014/0171070 A1 | 6/2014 | Tsai et al. |

FOREIGN PATENT DOCUMENTS

| | | |
|---|---|---|
| CN | 103037508 A | 4/2013 |
| CN | 103364774 A | 10/2013 |
| CN | 104950284 A | 9/2015 |
| JP | 2009159336 A | 7/2009 |
| JP | 2014044172 A | 3/2014 |
| WO | 2015054866 A1 | 4/2015 |
| WO | 2015095172 A1 | 6/2015 |

OTHER PUBLICATIONS

Foreign Communication From a Counterpart Application, Chinese Application No. 201510788507.2, Chinese Office Action dated Jul. 17, 2019, 7 pages.
Machine Translation and Abstract of Chinese Publication No. CN101094024, Dec. 26, 2007, 9 pages.
Machine Translation and Abstract of Chinese Publication No. CN103037508, Apr. 10, 2013, 13 pages.
Machine Translation and Abstract of Chinese Publication No. CN104950284, Sep. 30, 2015, 22 pages.
Machine Translation and Abstract of Japanese Publication No. JP2014044172, Mar. 13, 2014, 23 pages.
Foreign Communication From a Counterpart Application, PCT Application No. PCT/CN2016/102767, English Translation of International Search Report dated Jan. 23, 2017, 2 pages.
Foreign Communication From a Counterpart Application, PCT Application No. PCT/CN2016/102767, English Translation of Written Opinion dated Jan. 23, 2017, 6 pages.

* cited by examiner

| If a first device determines that a second device is in a still state before a wireless communication connection between the first device and the second device is broken, and the first device determines that the second device is in a moving state after the wireless communication connection between the first device and the second device is broken, the first device obtains a coordinate value of the still-state second device that is generated before the wireless communication connection between the first device and the second device is broken | Step 601 |

↓

| The first device obtains data of a speed sensor and a geomagnetic sensor of the second device that is generated after the wireless communication connection between the second device and the first device is broken | Step 602 |

↓

| The first device obtains, according to the data of the speed sensor, a moving track shape of the second device that is presented after the wireless communication connection between the second device and the first device is broken, and obtains, according to the data of the geomagnetic sensor, a moving track orientation presented after the wireless communication connection between the second device and the first device is broken | Step 603 |

↓

| The first device determines a moving track of the second device in a positioning coordinate system according to the coordinate value of the still-state second device that is generated before the wireless communication connection between the second device and the first device is broken, and the moving track shape and the moving track orientation of the second device that are presented after the wireless communication connection between the second device and the first device is broken | Step 604 |

FIG. 16

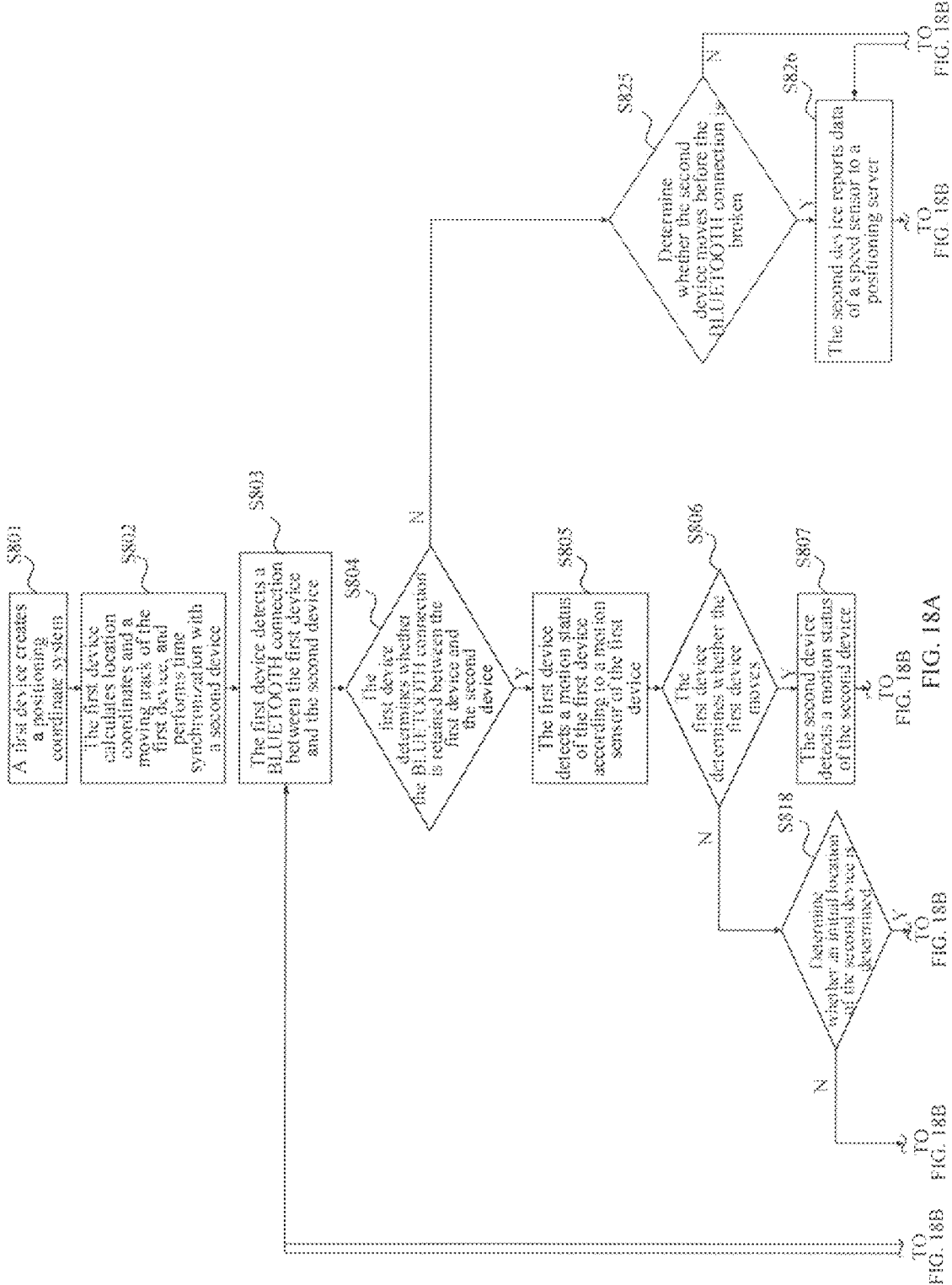

POSITIONING METHOD AND DEVICE

CROSS-REFERENCE TO RELATED APPLICATIONS

This application is a U.S. National Stage of International Patent Application No. PCT/CN2016/102767 filed on Oct. 20, 2016, which claims priority to Chinese Patent Application No. 201510788507.2 filed on Nov. 16, 2015. Both of the aforementioned applications are hereby incorporated by reference in their entireties.

TECHNICAL FIELD

Embodiments of the present disclosure relate to communications technologies, and in particular, to a positioning method and a device.

BACKGROUND

A positioning technology is an important technology in a wireless communications system. Many devices have a positioning function, for example, a mobile phone and a wearable device, such as a smart band and a smartwatch.

Global Positioning System (GPS), a wireless local area network (e.g. WI-FI), or a base station may be used to implement positioning.

However, in a process in which any one of the foregoing manners is used to implement positioning, the GPS positioning method requires a positioning satellite to implement positioning, and for the WI-FI or base station positioning method, positioning precision is restricted by WI-FI hotspot or base station deployment density. Within an area in which a few WI-FI hotspots or base stations are deployed, positioning precision is not desirable.

SUMMARY

This specification provides a positioning method and a device to implement accurate positioning without the help of a positioning satellite and without depending on access point or base station deployment density.

A first aspect provides a positioning method, applied to a first device, where the first device is in a moving state, and the method includes creating a positioning coordinate system, obtaining a moving track shape of a second device that is presented within preset duration, and obtaining n pieces of positioning data generated within the preset duration, where the positioning data includes a positioning parameter value of the second device and a coordinate value of the first device in the positioning coordinate system, and the positioning parameter value includes at least one of a received signal strength indicator (RSSI), a ranging value, or a relative angle, and determining a moving track of the second device in the positioning coordinate system according to the obtained moving track shape of the second device and the obtained n pieces of positioning data, where a wireless communication connection is established between the first device and the second device, the first device and the second device are time-synchronized, the moving track of the second device in the positioning coordinate system includes a coordinate value that is of the second device in the positioning coordinate system and that is generated within the preset duration, and n is a natural number greater than 1.

This implementation can accurately implement positioning the second device without the help of a positioning satellite and without depending on positioning facility (e.g. an access point or a base station) deployment density.

With reference to the first aspect, in a first possible implementation of the first aspect, obtaining a moving track shape of a second device that is presented within preset duration includes obtaining data of a speed sensor of the second device that is generated within the preset duration, where the data of the speed sensor includes a timestamp, and data of an acceleration sensor and an angular velocity sensor that is generated at a moment corresponding to the timestamp, and obtaining the moving track shape of the second device according to the data of the speed sensor.

In this implementation, in a process of positioning the second device accurately, only the data of the speed sensor of the second device needs to be obtained. The positioning manner is simple and the data of the speed sensor is easy to obtain.

With reference to the first possible implementation of the first aspect, in a second possible implementation of the first aspect, the method further includes obtaining data of a geomagnetic sensor of the second device that is generated within the preset duration, where the data of the geomagnetic sensor includes a timestamp, and data of the geomagnetic sensor of the second device that is generated at a moment corresponding to the timestamp, and determining a corrected moving track of the second device in the positioning coordinate system according to the moving track of the second device in the positioning coordinate system and the data of the geomagnetic sensor, where the corrected moving track includes a corrected coordinate value of the second device in the positioning coordinate system within the preset duration.

In this implementation, in a second device positioning process, the data of the geomagnetic sensor of the second device may be further obtained such that a more accurate moving track of the second device can be obtained, that is, accuracy of positioning the second device can be improved effectively.

With reference to the first aspect, in a third possible implementation of the first aspect, obtaining a moving track shape of a second device that is presented within preset duration includes obtaining moving track shape information of the second device, and obtaining, according to the moving track shape information, the moving track shape of the second device that is presented within the preset duration, where the moving track shape information of the second device is determined by the second device according to data of a speed sensor of the second device, and the data of the speed sensor includes a timestamp, and data of an acceleration sensor and an angular velocity sensor of the second device that is generated at a moment corresponding to the timestamp.

In this implementation, another manner of obtaining the track shape of the second device is provided such that the method for positioning the second device becomes more flexible.

With reference to any one of the first aspect, or the first to the third possible implementations of the first aspect, in a fourth possible implementation of the first aspect, the first device changes from the moving state to a still state, and the method further includes obtaining a first coordinate value that is of the first device in the positioning coordinate system and that is generated during a period when the first device is in the still state, obtaining a second coordinate value that is of the second device in the positioning coordinate system and that is generated before the first device changes to the still state, and setting the second coordinate value as a coordinate value of an initial point from which the second device starts to move during the period when the first device is in the still state, obtaining a moving track shape and multiple positioning parameter values that are of the second device and that are generated during the period when the first device is in the still state, and determining, according to the first coordinate value, the second coordinate value, and the moving track shape and the multiple positioning parameter values of the second device that are generated during the period when the first device is in the still state, a moving track that is of the second device in the positioning coordinate system and that is presented during the period when the first device is in the still state.

This implementation can optimize the solutions for the foregoing positioning methods, that is, positioning the second device can be implemented accurately in different scenarios.

With reference to any one of the first aspect, or the first to the third possible implementations of the first aspect, in a fifth possible implementation of the first aspect, the first device changes from the moving state to a still state, and the method further includes obtaining a third coordinate value of the first device in the positioning coordinate system and multiple positioning parameter values of the second device that are generated during a period when first device is in the still state, sending a notification message to the second device, where the notification message is used to instruct the second device to send data of a motion sensor of the second device that is generated during the period when the first device is in the still state, and the data of the motion sensor includes data of the speed sensor and data of the geomagnetic sensor, receiving the data of the motion sensor that is sent by the second device, obtaining, according to the received data of the speed sensor, a moving track shape of the second device that is presented during the period when the first device is in the still state, and obtaining, according to the data of the geomagnetic sensor, a moving track orientation of the second device that is presented during the period when the first device is in the still state, and determining, according to the third coordinate value, and the moving track shape, the moving track orientation, and the multiple positioning parameter values of the second device that are generated during the period when the first device is in the still state, a moving track that is of the second device in the positioning coordinate system and that is presented during the period when the first device is in the still state, where the data of the speed sensor includes a timestamp, and data of the acceleration sensor and the angular velocity sensor of the second device that is generated at a moment corresponding to the timestamp, and the data of the geomagnetic sensor includes a timestamp, and data of the geomagnetic sensor of the second device that is generated at a moment corresponding to the timestamp.

This implementation can optimize the solutions for the foregoing positioning methods, that is, positioning the second device can be implemented accurately in different scenarios.

A second aspect provides a positioning method, applied to a first device, where the first device is in a moving state, and the method includes obtaining a moving track shape of a second device that is presented before and after a wireless communication connection between the second device and the first device is broken, and a moving track of the second device that is presented before the wireless communication connection between the second device and the first device is broken, and matching the moving track shape of the second device that is presented before and after the wireless communication connection between the second device and the first device is broken and the moving track of the second device that is presented before the wireless communication connection between the second device and the first device is broken, to determine a moving track of the second device that is presented after the wireless communication connection between the second device and the first device is broken, where the second device is in a moving state, both the moving track of the second device that is presented before the wireless communication connection between the second device and the first device is broken and the moving track of the second device that is presented after the wireless communication connection between the second device and the first device is broken are moving tracks in one positioning coordinate system, and the moving track includes a coordinate value of the second device in the positioning coordinate system.

This implementation can accurately implement positioning the second device without the help of a positioning satellite and without depending on positioning facility (an access point or a base station) deployment density. It should be noted that in this implementation, "the moving track of the second device that is presented before the wireless communication connection between the second device and the first device is broken" can be obtained using any possible implementation of the first aspect.

With reference to the second aspect, in a first possible implementation of the second aspect, obtaining a moving track shape of a second device that is presented before and after a wireless communication connection between the second device and the first device is broken includes obtaining data of a speed sensor that is generated before and after the wireless communication connection between the second device and the first device is broken, where the data of the speed sensor includes a timestamp, and data of an acceleration sensor and an angular velocity sensor of the second device that is generated at a moment corresponding to the timestamp, and obtaining, according to the data of the speed sensor that is generated before and after the wireless communication connection between the second device and the first device is broken, the moving track shape of the second device that is presented before and after the wireless communication connection between the second device and the first device is broken.

With reference to the second aspect or the first possible implementation of the second aspect, in a second possible implementation of the second aspect, the method further includes when determining that after the wireless communication connection between the second device and the first device is broken, the second device has ever been in a still state in a motion process, and then changes from the still state to the moving state, obtaining a coordinate value of the second device that is generated during the period when the second device is in the still state, and obtaining data of a speed sensor and a geomagnetic sensor of the moving-state second device, obtaining a moving track shape of the moving-state second device according to the data of the speed sensor, and obtaining a moving track orientation of the moving-state second device according to the data of the geomagnetic sensor, and determining a moving track of the second device in the positioning coordinate system according to the coordinate value of the second device that is generated during the period when the second device is in the still state, and the moving track shape and the moving track orientation of the moving-state second device.

A third aspect provides a positioning method, applied to a first device, where the first device is in a moving state, and the method includes, if a second device is in a still state before a wireless communication connection between the second device and the first device is broken, and the second device is in a moving state after the wireless communication connection between the second device and the first device is broken, obtaining a first coordinate value of the still-state second device that is generated before the wireless communication connection between the second device and the first device is broken, obtaining data of a speed sensor and data of a geomagnetic sensor that are generated after the wireless communication connection between the second device and the first device is broken, obtaining, according to the data of the speed sensor, a moving track shape presented after the wireless communication connection between the second device and the first device is broken, and obtaining, according to the data of the geomagnetic sensor, a moving track orientation presented after the wireless communication connection between the second device and the first device is broken, and determining a moving track of the second device in the positioning coordinate system according to the first coordinate value, and the moving track shape and the moving track orientation that are presented after the wireless communication connection between the second device and the first device is broken.

In this implementation, in the following case, where the second device is still before the wireless communication connection between the second device and the first device is broken, and the second device moves after the wireless communication connection between the second device and the first device is broken, positioning the second device can also be implemented accurately without the help of a positioning satellite and without depending on positioning facility (e.g. an access point or a base station) deployment density.

A fourth aspect provides a first device, where the first device is in a moving state and includes a processing module configured to create a positioning coordinate system, and an obtaining module configured to obtain a moving track shape of a second device that is presented within preset duration, and obtain n pieces of positioning data generated within the preset duration, where the positioning data includes a positioning parameter value of the second device and a coordinate value of the first device in the positioning coordinate system, and the positioning parameter value includes at least one of an RSSI, a ranging value, or a relative angle, where the processing module is further configured to determine a moving track of the second device in the positioning coordinate system according to the obtained moving track shape of the second device and the obtained n pieces of positioning data, and a wireless communication connection is established between the first device and the second device, the first device and the second device are time-synchronized, the moving track of the second device in the positioning coordinate system includes a coordinate value that is of the second device in the positioning coordinate system and that is generated within the preset duration, and n is a natural number greater than 1.

With reference to the fourth aspect, in a first possible implementation of the fourth aspect, when obtaining a moving track shape of a second device that is presented within preset duration, the obtaining module is configured to obtain data of a speed sensor of the second device that is generated within the preset duration, and obtain the moving track shape of the second device according to the data of the speed sensor, where the data of the speed sensor includes a timestamp, and data of an acceleration sensor and data of an angular velocity sensor that are generated at a moment corresponding to the timestamp.

With reference to the first possible implementation of the fourth aspect, in a second possible implementation of the fourth aspect, the obtaining module is further configured to obtain data of a geomagnetic sensor of the second device that is generated within the preset duration, where the data of the geomagnetic sensor includes a timestamp, and data of the geomagnetic sensor of the second device that is generated at a moment corresponding to the timestamp, and the processing module is further configured to determine a corrected moving track of the second device in the positioning coordinate system according to the moving track of the second device in the positioning coordinate system and the data of the geomagnetic sensor, where the corrected moving track includes a corrected coordinate value of the second device in the positioning coordinate system within the preset duration.

With reference to the fourth aspect, in a third possible implementation of the fourth aspect, when obtaining a moving track shape of a second device, the obtaining module is configured to obtain moving track shape information of the second device, and obtain, according to the moving track shape information, the moving track shape of the second device that is presented within the preset duration, where the moving track shape information of the second device is determined by the second device according to data of a speed sensor of the second device, where the data of the speed sensor includes a timestamp, and data of an acceleration sensor and an angular velocity sensor of the second device that is generated at a moment corresponding to the timestamp.

With reference to any one of the fourth aspect, or the first to the third possible implementations of the fourth aspect, in a fourth possible implementation of the fourth aspect, the first device changes from the moving state to a still state, and the obtaining module is further configured to obtain a first coordinate value of the first device generated during a period when the first device is in the still state in the positioning coordinate system, obtain a second coordinate value that is of the second device in the positioning coordinate system and that is generated before the first device changes to the still state, and use the second coordinate value as a coordinate value of an initial point from which the second device starts to move during the period when the first device is in the still state, and obtain a moving track shape and multiple positioning parameter values that are of the second device and that are generated during the period when the first device is in the still state, and the processing module is further configured to determine, according to the first coordinate value, the second coordinate value, and the moving track shape and the multiple positioning parameter values of the second device that are generated during the period when the first device is in the still state, a moving track that is of the second device in the positioning coordinate system and that is presented during the period when the first device is in the still state.

With reference to any one of the fourth aspect, or the first to the third possible implementations of the fourth aspect, in a fifth possible implementation of the fourth aspect, the first device changes from the moving state to a still state, and the obtaining module is further configured to obtain a third coordinate value of the first device in the positioning coordinate system and multiple positioning parameter values of the second device that are generated during a period when the first device is in the still state, the first device further includes a transceiver module, and the transceiver module is configured to send a notification message to the second device, where the notification message is used to instruct the second device to send data of a motion sensor of the second device that is generated during the period when the first device is in the still state, and the data of the motion sensor includes data of the speed sensor and data of the geomagnetic sensor, the transceiver module is further configured to receive the data of the motion sensor that is sent by the second device, the obtaining module is further configured to obtain, according to the data of the speed sensor that is received by the transceiver module, a moving track shape of the second device that is presented during the period when the first device is in the still state, and obtain, according to the data of the geomagnetic sensor that is received by the transceiver module, a moving track orientation of the second device that is presented during the period when the first device is in the still state, and the processing module is further configured to determine, according to the third coordinate value, and the moving track shape, the moving track orientation, and the multiple positioning parameter values of the second device that are generated during the period when the first device is in the still state, a moving track that is of the second device in the positioning coordinate system and that is presented during the period when the first device is in the still state, where the data of the speed sensor includes a timestamp, and data of the acceleration sensor and the angular velocity sensor of the second device that is generated at a moment corresponding to the timestamp, and the data of the geomagnetic sensor includes a timestamp, and data of the geomagnetic sensor of the second device that is generated at a moment corresponding to the timestamp.

A fifth aspect provides a first device, where the first device is in a moving state and includes an obtaining module configured to obtain a moving track shape presented before and after a wireless communication connection between a second device and the first device is broken, and a moving track of the second device that is presented before the wireless communication connection between the second device and the first device is broken, and a processing module configured to match the moving track shape of the second device that is presented before and after the wireless communication connection between the second device and the first device is broken and the moving track of the second device that is presented before the wireless communication connection between the second device and the first device is broken, to determine a moving track of the second device that is presented after the wireless communication connection between the second device and the first device is broken, where the second device is in a moving state, both the moving track of the second device that is presented before the wireless communication connection between the second device and the first device is broken and the moving track of the second device that is presented after the wireless communication connection between the second device and the first device is broken are moving tracks in one positioning coordinate system, and the moving track includes a coordinate value of the second device in the positioning coordinate system.

With reference to the fifth aspect, in a first possible implementation of the fifth aspect, when obtaining a moving track shape presented before and after a wireless communication connection between a second device and the first device is broken, the obtaining module is configured to obtain data of a speed sensor that is generated before and after the wireless communication connection between the second device and the first device is broken, and obtain, according to the data of the speed sensor that is generated before and after the wireless communication connection between the second device and the first device is broken, the moving track shape of the second device that is presented before and after the wireless communication connection between the second device and the first device is broken, where the data of the speed sensor includes a timestamp, and data of an acceleration sensor and an angular velocity sensor of the second device that is generated at a moment corresponding to the timestamp.

With reference to the fifth aspect or the first possible implementation of the fifth aspect, in a second possible implementation of the fifth aspect, the processing module is further configured to determine that the second device has ever been in a still state in a motion process after the wireless communication connection between the second device and the first device is broken, and the obtaining module is further configured to obtain a coordinate value of the second device that is generated during the period when the second device is in the still state, obtain data of a speed sensor and a geomagnetic sensor of the moving-state second device, obtain a moving track shape of the moving-state second device according to the data of the speed sensor, obtain a moving track orientation of the moving-state second device according to the data of the geomagnetic sensor, and determine a moving track of the second device in the positioning coordinate system according to the coordinate value of the second device that is generated during the period when the second device is in the still state, and the moving track shape and the moving track orientation of the moving-state second device.

A sixth aspect provides a first device, where the first device is in a moving state and includes an obtaining module configured to, when a second device is in a still state before a wireless communication connection between the second device and the first device is broken, and the second device is in a moving state after the wireless communication connection between the second device and the first device is broken, obtain a first coordinate value of the still-state second device that is generated before the wireless communication connection between the second device and the first device is broken, obtain data of a speed sensor and data of a geomagnetic sensor that are generated after the wireless communication connection between the second device and the first device is broken, and obtain, according to the data of the speed sensor, a moving track shape presented after the wireless communication connection between the second device and the first device is broken, and obtain, according to the data of the geomagnetic sensor, a moving track orientation presented after the wireless communication connection between the second device and the first device is broken, and a processing module configured to determine a moving track of the second device in the positioning coordinate system according to the first coordinate value, and the moving track shape and the moving track orientation that are presented after the wireless communication connection between the second device and the first device is broken.

A seventh aspect provides a first device, where the first device includes a memory, a bus system, and at least one processor, and the memory and the at least one processor are connected using the bus system, and the memory stores one or more programs, the one or more programs include an instruction, and when the instruction is executed by the first device, the first device executes the method according to any one of the first aspect or the first to the fifth possible implementations of the first aspect, the method according to any one of the second aspect or the first or the second possible implementation of the second aspect, or the method according to the third aspect.

According to an eighth aspect, a computer-readable storage medium that stores one or more programs is provided, where the one or more programs include an instruction, and when the instruction is executed by an electronic device, the electronic device executes the method according to any one of the first aspect or the first to the fifth possible implementations of the first aspect, the method according to any one of the second aspect or the first or the second possible implementation of the second aspect, or the method according to the third aspect.

According to the positioning method and the device provided in this specification, the first device creates the positioning coordinate system, and obtains the moving track shape of the second device that is presented within the preset duration, positioning parameter values of the second device that are generated at n moments within the preset duration, and the coordinate value that is of the first device in the positioning coordinate system and that is generated within the preset duration. The first device determines the moving track of the second device in the positioning coordinate system according to the obtained moving track shape of the second device, positioning parameter values of the second device, and coordinate value of the first device. In this way, positioning the second device is accurately implemented without the help of the positioning satellite and without depending on the positioning facility (the access point and the base station) deployment density.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

FIG. 16 is a flowchart of Embodiment 5 of the present disclosure;

FIG. 18A, FIG. 18B and FIG. 18C are a flowchart of Embodiment 6 of the present disclosure;

DESCRIPTION OF EMBODIMENTS

Figure 1:
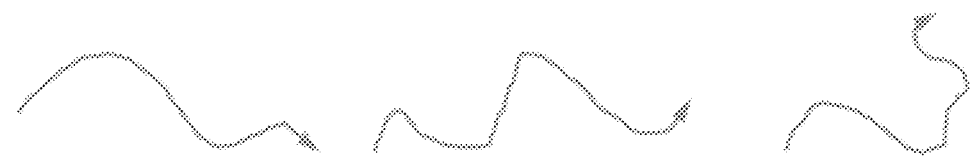
FIG. 1 is a schematic diagram of moving tracks in different shapes according to embodiments of the present disclosure.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

In the embodiments of the present disclosure, positioning is implemented using a motion sensor integrated into a device (such as a smartphone, a smartwatch, or a smart band) to calculate a moving track and implement positioning and navigation functions. The motion sensor includes a speed sensor and a geomagnetic sensor. The speed sensor includes an acceleration sensor and an angular velocity sensor (such as a gyroscope). The moving track is a line formed by locations that a moving entity (such as a smartphone, a smartwatch, or a smart band) passes through at different moments. The moving track precisely illustrates locations that the moving entity passes through. Data of the motion sensor, used to calculate the moving track includes the following three elements a moving track shape, a moving track orientation, and an initial point. The moving track shape indicates a relative location between any multiple points on a moving track. That is, if the relative location between any points is determined, the moving track shape is determined accordingly, and vice versa. The moving track orientation indicates an azimuth between a start point and an end point, where the start point and the end point are any points specified on a moving track. The initial point refers to any point whose absolute location coordinates are given on a moving track. It should be noted that the initial point is not necessarily a start location of the moving track, and may be any point whose absolute location coordinates are given on the moving track. A literal meaning of "initial" is not construed as a limitation to a specific meaning of the initial point. It should be further noted that the "absolute location coordinates" are location coordinates of the initial point in a positioning coordinate system.

The "positioning coordinate system" used in this specification further refers to a coordinate system of an absolute location of a device relative to the earth. The positioning coordinate system may be a coordinate system created with a current location of the device as an origin after the device triggers a positioning function. In a positioning implementation process, the origin, an X-axis, a Y-axis, and a Z-axis of the positioning coordinate system do not change with movement of the device. That is, once the positioning coordinate system is created by the device, the positioning coordinate system does not change in the positioning implementation process. Certainly, it may be understood that, after the device disables the positioning function after creating the positioning coordinate system and completing the positioning, if the device triggers the positioning function again, the device may create a new positioning coordinate system and implement positioning.

"Time-synchronized" used in this specification further means that alignment is performed on clocks of multiple devices. Different implementations may be used in the alignment process. For example, a clock of one device may be used as a reference, and a clock of any other device is adjusted to be the same as that of the reference. Correspondingly, "time-synchronized" of multiple devices means that clock time of the multiple devices keeps the same. Certainly, it may be understood that, it may be that each of the multiple devices obtains a clock difference between a clock of the device and that of another device, and the devices may use the clock difference to implement clock alignment. Further, "time-synchronized" in the embodiments of the present disclosure may be that, time synchronization is performed on a first device and a second device after the first device creates a positioning coordinate system, or time synchronization is performed on a first device and a second device after a wireless communication connection is established between the first device and the second device.

"First," "second," "third," and the like used in this specification are merely used to differentiate individuals (such as a device or a positioning value), and do not indicate a meaning such as a size or a sequence.

"Positioning parameter value" used in this specification is further used to indicate a relative location between devices, and may further include one or a combination of an RSSI, a ranging value, or a relative angle. The ranging value further refers to a distance between locations of two devices. The ranging value may be obtained in multiple manners, for example, using a supersonic wave or in another implementation for range measurement. The manners are not listed one by one herein. The relative angle further refers to an angle between a connection line of two devices and a reference direction. The reference direction may be a tangent line direction of a moving track of a device, a normal line direction of a moving track, or the like. The relative angle may be obtained in multiple manners, for example, using an array antenna of a device to receive a signal sent by another device in order to obtain the relative angle.

To further explain the three basic elements of a moving track, the following uses three schematic diagrams as examples for description.

Figure 2:
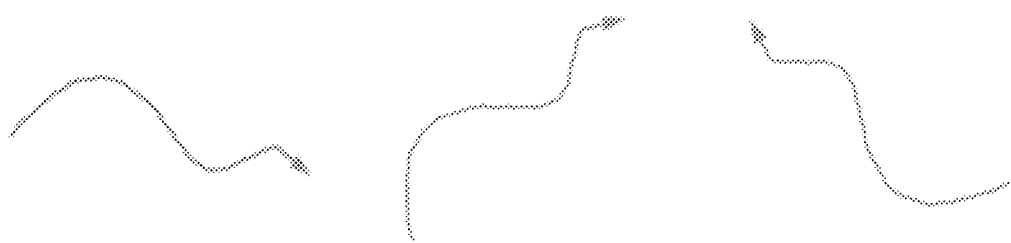
FIG. 2 is a schematic diagram of moving tracks with a same shape but different orientations according to embodiments of the present disclosure.
Figure 3:
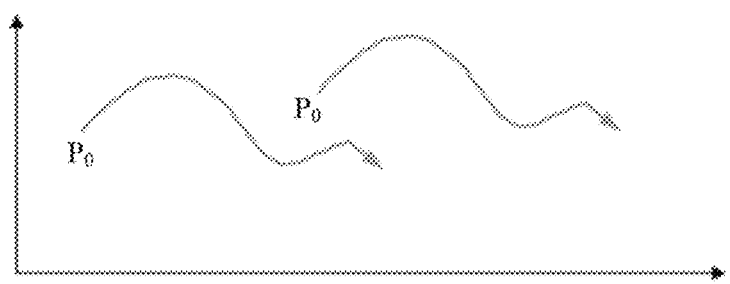
FIG. 3 is a schematic diagram of moving tracks with a same shape and orientation but different initial points according to embodiments of the present disclosure.

FIG. 1 is a schematic diagram of moving tracks in different shapes according to the embodiments of the present disclosure. FIG. 2 is a schematic diagram of moving tracks with a same shape but different orientations according to the embodiments of the present disclosure. FIG. 3 is a schematic diagram of moving tracks with a same shape and orientation but different initial points according to the embodiments of the present disclosure. As shown in FIG. 1, based on an acceleration sensor and the angular velocity sensor, such as a gyroscope, a definite moving track shape may be obtained by means of calculation. As shown in FIG. 1, the three moving tracks have different shapes. It can be learned that, only a moving track shape can be determined by obtaining only data of the acceleration sensor and data of the angular velocity sensor of a device, and an orientation and an initial location of a moving track cannot be determined. FIG. 2 shows the tracks with the same moving track shape but different orientations. On a basis of FIG. 1, that is, on a premise that the moving track shape is determined, if data of a geomagnetic sensor of the device can be collected, an orientation of the moving track can be further determined. FIG. 3 shows the moving tracks with the same shape and orientation but different initial points. On a basis of FIG. 1 and FIG. 2, that is, on a basis that the moving track shape and the moving track orientation are determined, a moving track can be uniquely determined only after a location of an initial point of the moving track is determined.

In the embodiments of the present disclosure, a motion sensor is used to determine all of the three basic elements in different implementations such that the definite moving track can be obtained by means of calculation. The following embodiments describe the different implementations in detail.

Figure 4:
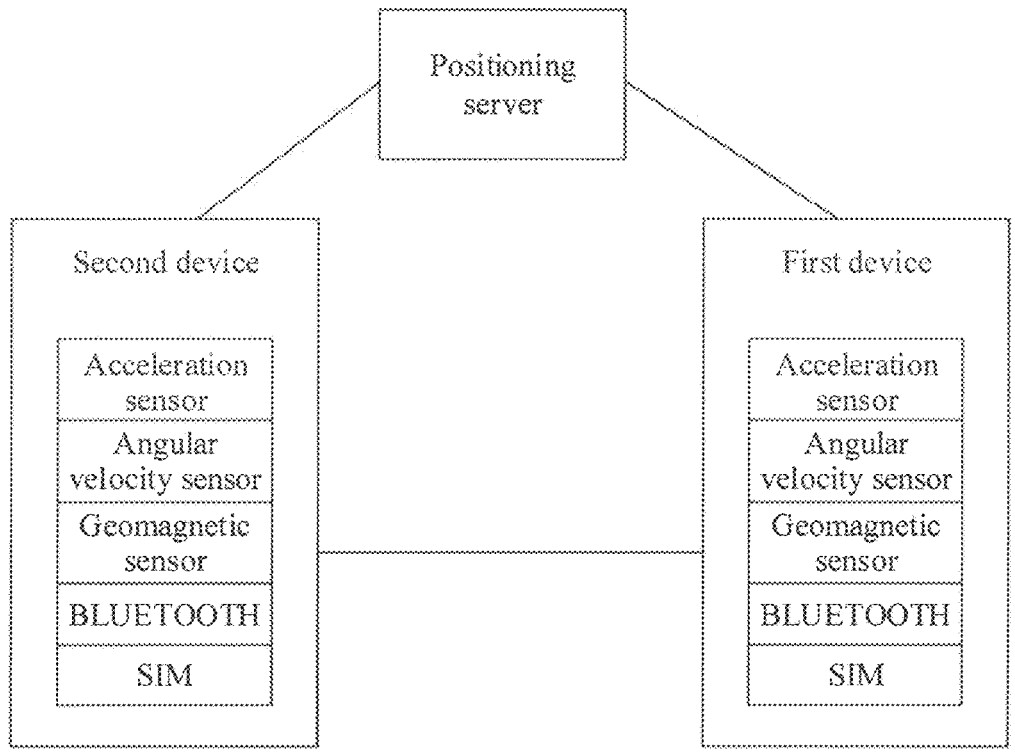
FIG. 4 is a schematic architecture diagram of a system implementing an embodiment of the present disclosure.

FIG. 4 is a schematic architecture diagram of a system implementing an embodiment of the present disclosure. As shown in FIG. 4, the system implementing a positioning method of the present disclosure includes a first device and a second device. A motion sensor, a BLUETOOTH module, and a cellular data communication module may be integrated into the first device. The motion sensor may further include an acceleration sensor, an angular velocity sensor (such as a gyroscope), and a geomagnetic sensor (such as an electronic compass). The BLUETOOTH module may be flexibly set according to a requirement (for example, the BLUETOOTH module may support BLUETOOTH 4.0). The cellular data communication module may be further a subscriber identity module (SIM). A motion sensor, a BLUETOOTH module, and a cellular data communication module may also be integrated into the second device. A BLUETOOTH connection may be established between the first device and the second device within a BLUETOOTH communication range in order to implement positioning. Certainly, positioning may also be implemented when the first device and the second device are not within the BLUETOOTH communication range. A specific implementation is that the second device may send data of the motion sensor (such as data of the acceleration sensor, data of the angular velocity sensor, and data of the geomagnetic sensor) or a processing result to a positioning server such that the first device can obtain required data of the motion sensor or the processing result from the positioning server. It should be noted that, in the positioning method used when the first device and the second device are not within the BLUETOOTH communication range, the first device and the second device do not need to obtain a coordinate value of the positioning server to implement positioning, and the positioning server is not used to calculate a location. The positioning server serves only as a data transmission medium, that is, is used only for data transmission and forwarding. It may be understood that, the positioning server may be replaced with another device, such as a WI-FI hotspot. Both the first device and the second device may be smartphones, smart bands, smartwatches, and other wearable devices. In a positioning implementation process, positioning may be implemented between a smartphone (the first device) and a smart band (the second device), between a smartwatch (the first device) and another smartwatch (the second device), or between other different combinations using the method of this embodiment of the present disclosure.

The following embodiments of the present disclosure are described using an example in which a first device is a smartphone, a second device is a smartwatch, and the smartwatch is positioned using the smartphone. Positioning can be implemented for all other combinations according to the implementations in the following embodiments.

Figure 5:
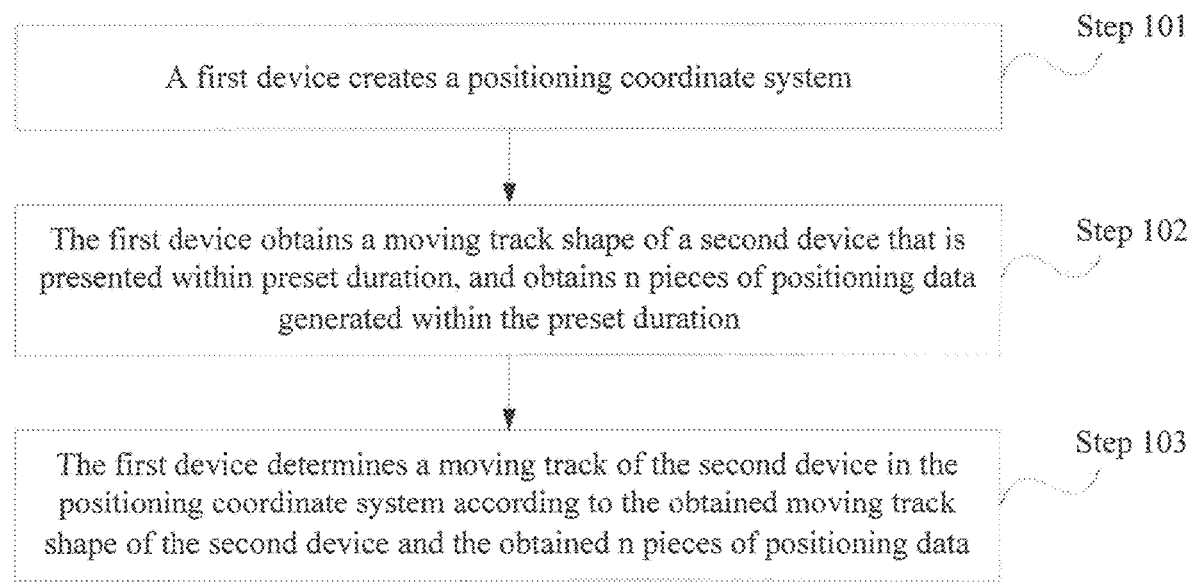
FIG. 5 is a flowchart of Embodiment 1 of the present disclosure.

FIG. 5 is a flowchart of Embodiment 1 of the present disclosure. As shown in FIG. 5, the method of this embodiment may include the following steps.

Step 101: A first device creates a positioning coordinate system.

After receiving a trigger signal for positioning a second device, the first device creates the positioning coordinate system using a location of the first device at a current moment as an origin of the positioning coordinate system, a projection, on a horizontal plane, of a movement velocity direction of the first device at the current moment as a positive direction of a Y-axis of the positioning coordinate system, a direction perpendicular to the direction of the Y-axis on the horizontal plane as a positive direction of an X-axis of the positioning coordinate system, and an upward direction of a location orthogonal to both the X-axis and the Y-axis at the current moment as a positive direction of a Z-axis of the positioning coordinate system. In addition, an azimuth of the positioning coordinate system relative to the earth is determined.

Step 102: The first device obtains a moving track shape of a second device that is presented within preset duration, and obtains n pieces of positioning data generated within the preset duration.

The positioning data includes a positioning parameter value of the second device and a coordinate value of the first device in the positioning coordinate system. That is, n positioning parameter values of the second device and n coordinate values of the first device in the positioning coordinate system are obtained.

It should be noted that, a sequence of the two actions of obtaining, by the first device, the moving track shape of the second device that is presented within the preset duration and obtaining, by the first device, the n pieces of positioning data generated within the preset duration is not limited, and the two actions may be executed at the same time.

A wireless communication connection is established between the first device and the second device. The positioning parameter value includes at least one of an RSSI, a ranging value, or a relative angle.

That the first device obtains the n pieces of positioning data may be further that the first device obtains, after creating the positioning coordinate system, positioning parameter values of the second device and coordinate values of the first device in the positioning coordinate system corresponding to two, three, or more moments. Certainly, the first device may constantly obtain the positioning parameter value of the second device and the coordinate value of the first device in the positioning coordinate system at a specific frequency, provided that n is a natural number greater than 1. It may be understood that, a larger value of n indicates higher positioning precision of the first device.

Further, the wireless communication connection may be a BLUETOOTH communication connection. Correspondingly, the positioning parameter value of the second device may be further the RSSI. Certainly, it may be understood that, the positioning parameter value being the RSSI in this embodiment of the present disclosure is not construed as a limitation. For example, the positioning parameter value may be another parametric value such as the ranging value or the relative angle or a combination thereof, and all of these parametric values may be used as a constraint condition to calculate a moving track of the second device.

Step 103: The first device determines a moving track of the second device in the positioning coordinate system according to the obtained moving track shape of the second device and the obtained n pieces of positioning data.

The first device and the second device are time-synchronized. The moving track includes a coordinate value of the second device in the positioning coordinate system within the preset duration. That is, if the moving track of the second device is determined, a location of the second device at any moment within the preset length can be obtained.

After creating the positioning coordinate system, the first device obtains data of a motion sensor (such as an acceleration sensor, an angular velocity sensor gyroscope, and a geomagnetic sensor) of the first device, and obtains a moving track shape and a moving track orientation of the first device in the positioning coordinate system according to the data of the motion sensor. Because an initial point of the first device is the origin of the positioning coordinate system, the initial point, the moving track shape, and the moving track orientation of the first device may be determined. Therefore, a moving track of the first device in the positioning coordinate system may be uniquely determined. After the moving track is determined, information about each location (each coordinate value) of the first device in the positioning coordinate system may be determined.

Figure 6:
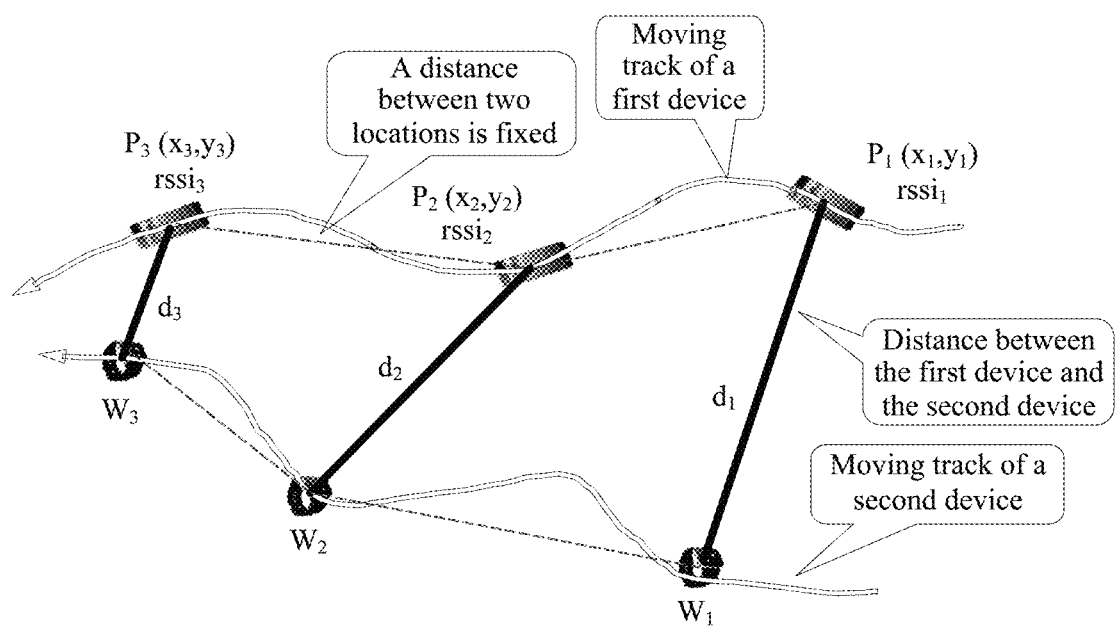
FIG. 6 is a principle diagram of a method for determining a first moving track of a second device according to a positioning method of the present disclosure.

In this embodiment, both the first device and the second device may be in a moving state. The following briefly describes an implementation principle for obtaining, by the first device, the moving track of the second device in the positioning coordinate system according to the moving track shape of the second device, coordinate values of the first device at multiple moments, and positioning parameter values at multiple moments. FIG. 6 is a principle diagram of a method for determining the moving track of the second device according to the positioning method of the present disclosure. As shown in FIG. 6, distances $d_1$, $d_2$, and $d_3$ between the first device and the second device may be obtained, by means of calculation, according to positioning parameter values ($rssi_1$, $rssi_2$, and $rssi_3$) of the second device corresponding to locations of the first device with coordinate values $P_1(x_1,y_1)$, $P_2(x_2,y_2)$, and $P_3(x_3,y_3)$. A moving track of the first device, the distances $d_1$, $d_2$, and $d_3$ between locations of the first device and the second device at same moments, and a moving track shape of the second device may form a rigid body. For the rigid body, when the moving track of the first device is determined, a moving track of the second device and a coordinate value at each moment are determined accordingly. Therefore, in this embodiment of the present disclosure, after the coordinate values ($P_1(x_1, y_1)$, $P_2(x_2,y_2)$, and $P_3(x_3,y_3)$) of the first device at multiple moments within the preset duration, the positioning parameter values ($rssi_1$, $rssi_2$, and $rssi_3$) of the second device at the multiple moments, and the moving track shape of the second device within the preset duration are obtained, the moving track of the second device within the preset duration may be determined such that coordinate values ($W_1$, $W_2$, $W_3$, and the like) of the second device at all the moments within the preset duration may be obtained. In this way, positioning the second device is implemented. It should be noted that, in another possible implementation, after the coordinate values of the first device at the multiple moments within the preset duration, the positioning parameter values of the second device at the multiple moments, and a moving track shape of the second device within another duration are obtained, a moving track of the second device within the other duration may be determined such that a coordinate value of the second device at each moment within the other duration can be obtained. In this way, positioning the second device is implemented. The other duration may be longer than the preset duration, but need to include a time period of the preset duration.

Further, obtaining the moving track shape of the second device that is presented within the preset duration in step 102 may include obtaining data of a speed sensor of the second device that is generated within the preset duration, where the data of the speed sensor includes a timestamp, and data of an acceleration sensor and data of an angular velocity sensor that are generated at a moment corresponding to the timestamp, and obtaining the moving track shape of the second device according to the data of the speed sensor.

That is, the second device needs to report only the data of the acceleration sensor and the angular velocity sensor of the second device. The first device may obtain, by means of calculation, the moving track shape of the second device according to the data of the acceleration sensor and the angular velocity sensor of the second device, and can determine the moving track of the second device according to the moving track shape using the foregoing method in this embodiment in order to position the second device.

There may be multiple specific implementations of obtaining the data of the speed sensor of the second device by the first device. For example, the first device may receive the data of the speed sensor that is sent by the second device, the first device may obtain, from a positioning server, the data of the speed sensor of the second device, or the like. The data of the speed sensor includes a timestamp, and data of the acceleration sensor and the angular velocity sensor of the second device that is generated at a moment corresponding to the timestamp.

In another possible implementation of obtaining the moving track shape of the second device that is presented within the preset duration in step 102, the first device obtains moving track shape information of the second device, and obtains, according to the moving track shape information, the moving track shape of the second device that is presented within the preset duration. That is, the second device may obtain, by means of calculation, the moving track shape of the second device, and send the moving track shape to the first device in a preset format. The first device parses the moving track shape information to obtain the moving track shape of the second device.

It should be noted that, in the foregoing embodiment, the distances $d_1$, $d_2$, and $d_3$ between the first device and the second device may be obtained, by means of calculation, according to the positioning parameter values ($rssi_1$, $rssi_2$, and $rssi_3$) of the second device. An error exists between the calculated distances $d_1$, $d_2$, and $d_3$ and actual distances between the first device and the second device. Therefore, the moving track of the second device (that is, coordinate values of the first device at multiple moments) may be further determined by means of data fitting. The moving track of the second device is obtained by means of mathematical fitting according to the moving track shape of the second device and a distance value between the first device and the second device that is obtained by means of calculation based on an RSSI. The data fitting manners may be further using a fitting algorithm such as a least square method or a weighted least square method.

Further, after step 103, the first device may further obtain data of a geomagnetic sensor of the second device to correct the moving track of the second device. Further, the first device obtains the data of the geomagnetic sensor of the second device that is generated within the preset duration, where the data of the geomagnetic sensor includes a timestamp, and data of the geomagnetic sensor of the second device at a moment corresponding to the timestamp, and the first device obtains a corrected moving track of the second device in the positioning coordinate system according to the moving track of the second device in the positioning coordinate system and the data of the geomagnetic sensor, where the corrected moving track includes a corrected coordinate value of the second device in the positioning coordinate system within the preset duration. This further illustrates that, the first device of the present disclosure may position the second device by obtaining the data of the acceleration sensor and the data of the angular velocity sensor. This can effectively reduce communication data traffic between the first device and the second device and energy consumption. If the data of the geomagnetic sensor of the second device may be further obtained, the obtained moving track may be further corrected such that a more accurate moving track can be obtained to implement precise positioning.

In this embodiment, the first device creates the positioning coordinate system, obtains the moving track shape of the second device that is presented within the preset duration, the positioning parameter values of the second device and the coordinate values of the first device in the positioning coordinate system that are generated at n moments within the preset duration. Then, the first device determines the moving track of the second device in the positioning coordinate system according to the obtained moving track shape of the second device, positioning parameter values of the second device, and coordinate values of the first device such that positioning the second device is implemented without the help of a positioning facility (e.g. a positioning satellite, an access point, or a base station).

For the moving track of the second device that is obtained in the embodiment shown in FIG. 6, an error accumulated with time is generated. Therefore, a positioning method is provided based on the foregoing embodiment, "piecewise calculation and global fitting." That is, the method of the embodiment shown in FIG. 5 and FIG. 6 may be used to obtain moving tracks of the second device that are presented within different preset duration. The different preset duration may be consecutive duration. That is, a moving track of the second device within each preset duration is calculated, and then global fitting is performed, according to a time sequence, on all the moving tracks of the second device that are presented within all the preset durations. In this way, precision of determining a moving track presented within long duration can be improved. It should be noted that, both the first device and the second device are in a moving state. Further, the first device uses the method of the embodiment in FIG. 5 to calculate the moving track of the second device that is presented within each preset length. That is, the first device obtains all moving track sections, and then performs global fitting on all the moving track sections to obtain a smooth moving track, that is, the moving track of the second device in the positioning coordinate system.

Figure 7:
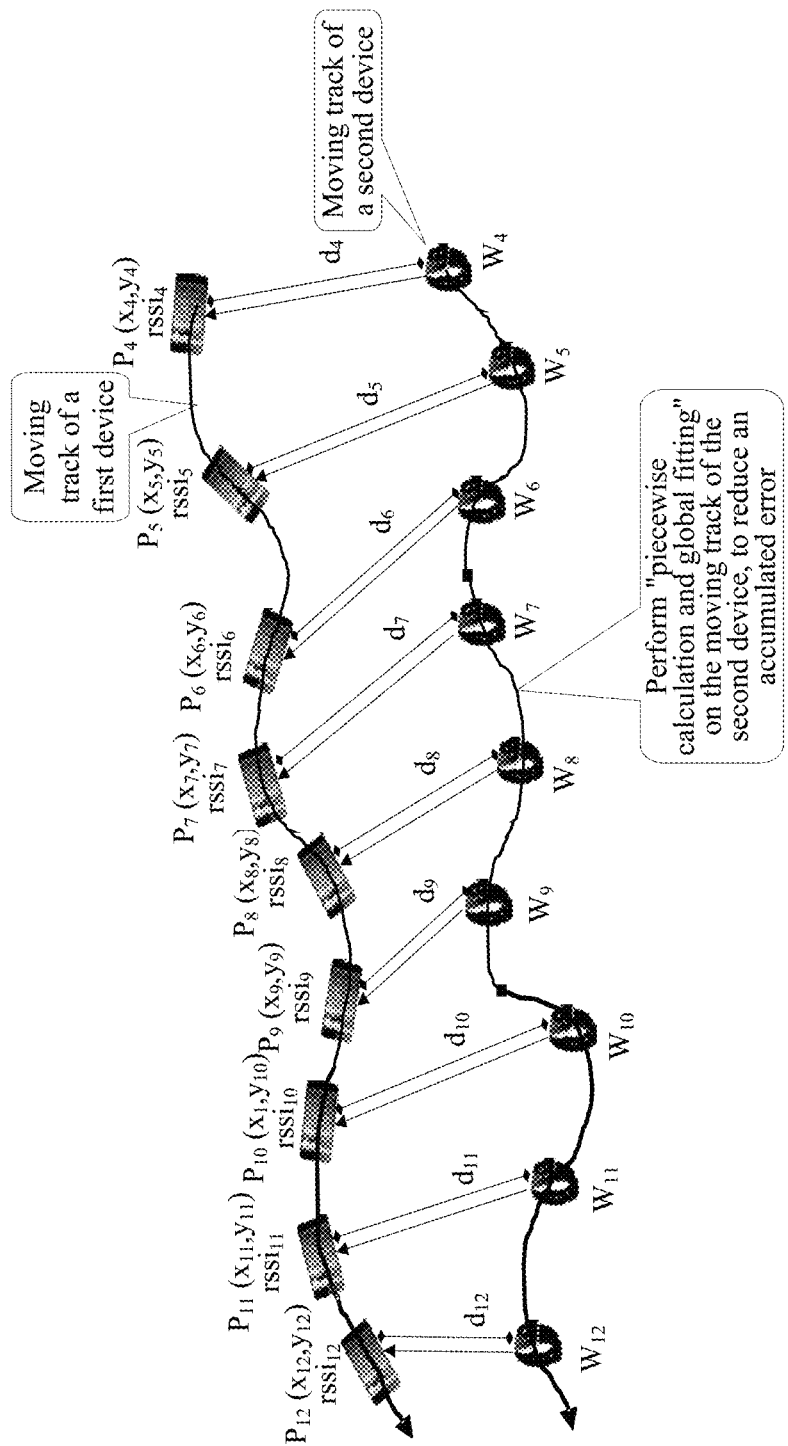
FIG. 7 is a schematic diagram of Embodiment 1 of the present disclosure.

Further, refer to a schematic diagram in FIG. 7. FIG. 7 is the schematic diagram of Embodiment 1 of the present disclosure. As shown in FIG. 7, the first device may first obtain coordinate values $P_4$ ($x_4,y_4$), $P_5$ ($x_5,y_5$), and $P_6$ ($x_6,y_6$) of the first device at three moments, obtain positioning parameter values ($rssi_4$, $rssi_5$, and $rssi_6$) of the second device at locations with the coordinate values $P_4$ ($x_4,y_4$), $P_5$ ($x_5,y_5$), and $P_6$ ($x_6,y_6$), obtain distances ($d_4$, $d_5$, and $d_6$) between the first device and the second device according to the positioning parameter values ($rssi_4$, $rssi_5$, and $rssi_6$), and obtain a moving track shape of the second device that is presented within a time period corresponding to a period when the first device moves from $P_4$ ($x_4,y_4$) to $P_6$ ($x_6,y_6$). The first device may determine, according to the coordinate values $P_4$ ($x_4,y_4$), $P_5$ ($x_5,y_5$), and $P_6$ ($x_6,y_6$) of the first device at the three moments, the distances ($d_4$, $d_5$, and $d_6$) between the first device at the locations with the coordinate values $P_4$ ($x_4,y_4$), $P_5$ ($x_5,y_5$), and $P_6$ ($x_6,y_6$) and the second device, and the moving track shape of the second device within the corresponding time period, a moving track of the second device that is presented within the time period, that is, a moving track of the second device from $W_4$ to $W_6$. Further, the first device determines a moving track of the second device from $W_7$ to $W_9$ and a moving track of the second device from $W_{10}$ to $W_{12}$ using a same method. Finally, the first device performs global fitting according to all the moving track sections to obtain a global moving track of the second device shown in FIG. 7, that is, a moving track between $W_4$ and $W_{12}$. It should be noted that, for the method for obtaining the moving track shape, refer to the specific description of the embodiment shown in FIG. 5. Details are not described herein again.

According to the method of piecewise calculation and global fitting, in a process of implementing positioning the second device by the first device, an error, accumulated with time, in the moving track shape of the second device obtained by the first device can be effectively reduced, effectively improving precision of an obtained moving track.

In the embodiment in FIG. 6 and FIG. 7, both the first device and the second device may be in the moving state. Certainly, in an actual positioning process, a case in which the first device moves and the second device is still exists. Based on the positioning method of the embodiment shown in FIG. 5, positioning the second device when the first device moves and the second device is still is described with reference to FIG. 8 and FIG. 9.

Figure 8:
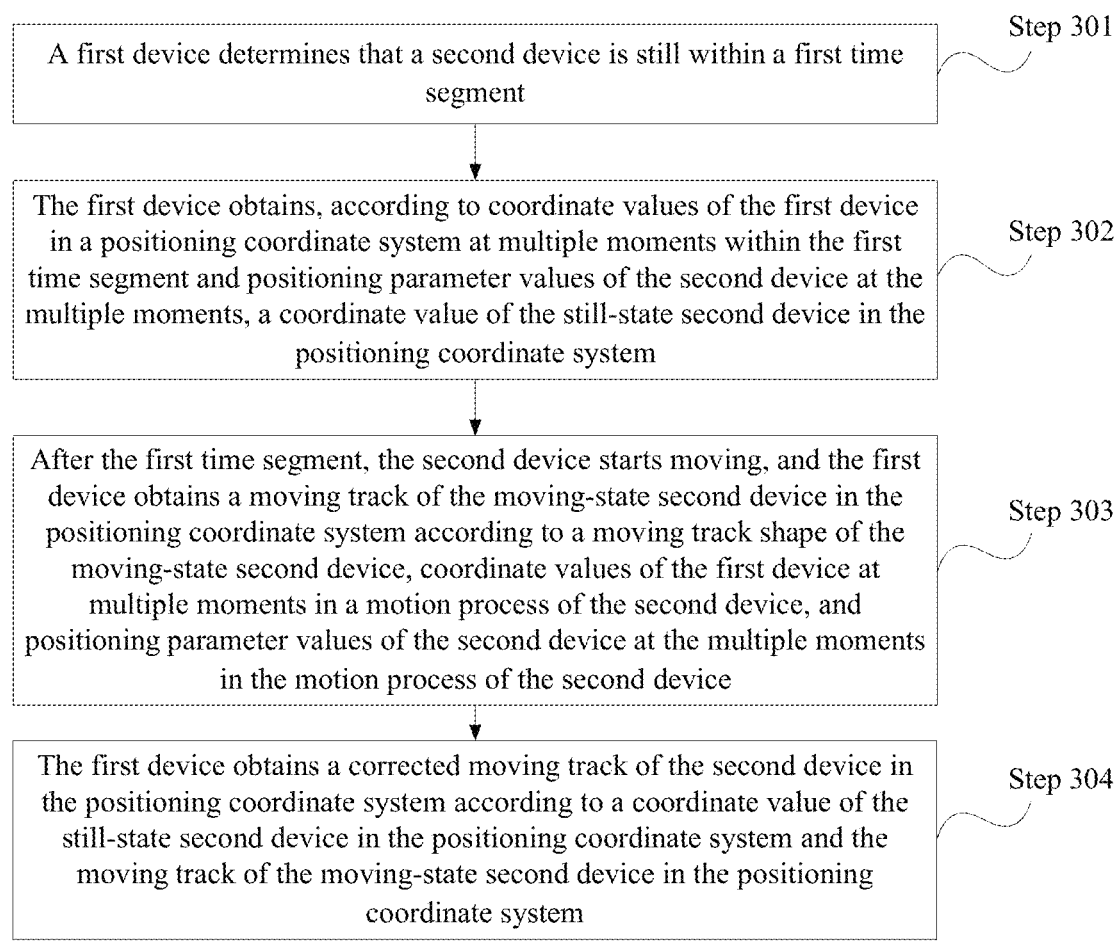
FIG. 8 is a flowchart of Embodiment 2 of the present disclosure.
Figure 9:
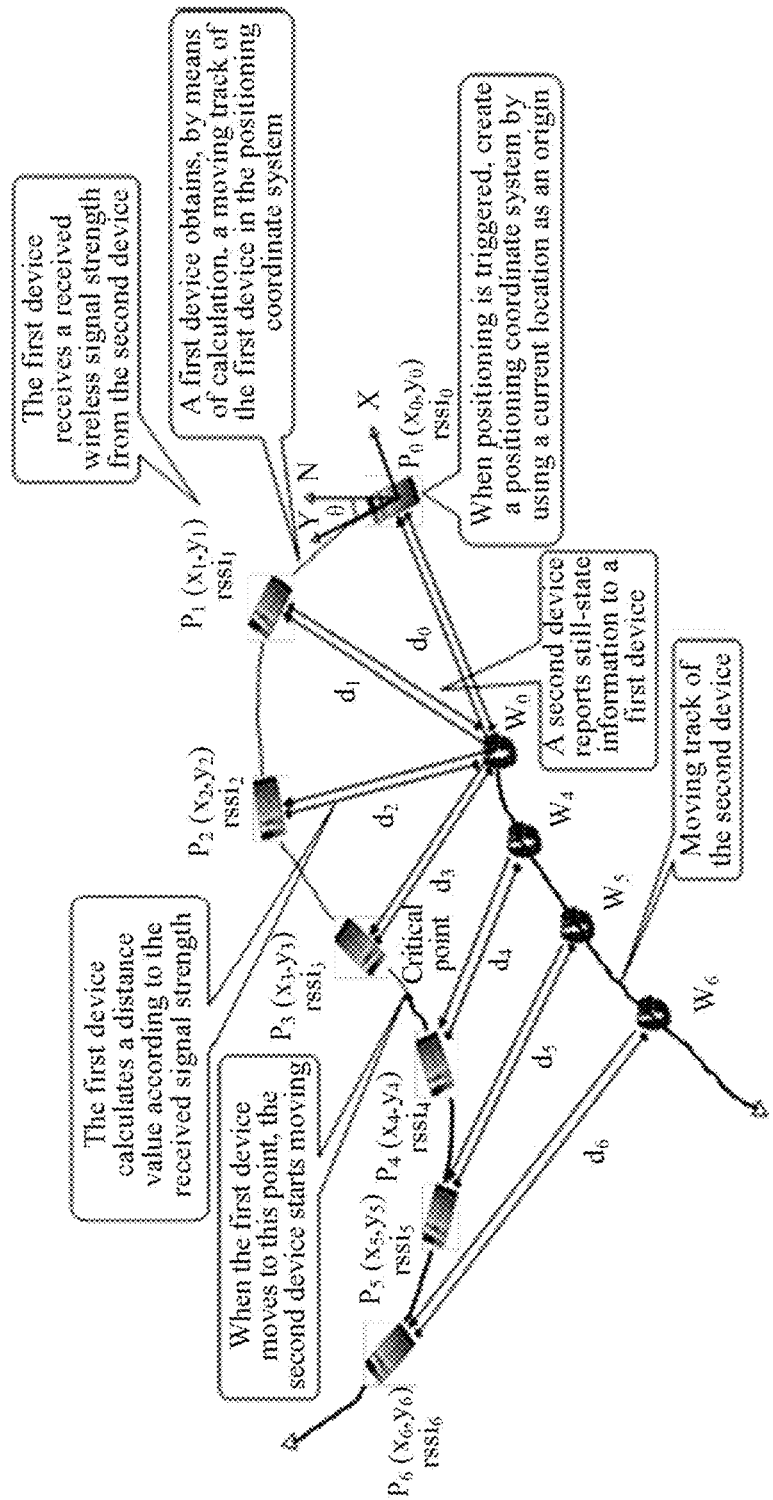
FIG. 9 is a schematic diagram of Embodiment 2 of the present disclosure.

FIG. 8 is a flowchart of Embodiment 2 of the present disclosure, and FIG. 9 is a schematic diagram of Embodiment 2 of the present disclosure. As shown in FIG. 8, the method includes the following steps.

Step 301: A first device determines that a second device is still within a first time segment.

A wireless communication connection is established between the first device and the second device. A specific implementation of step 301 may be receiving, by the first device, multiple motion status messages sent by the second device, where the motion status message includes a timestamp and still-state information at a moment corresponding to the timestamp, and determining, by the first device according to the multiple motion status messages, the first time segment during which the second device is in the still state. Certainly, it may be understood that, there may be multiple other implementations of determining, by the first device, that the second device is still within the first time segment. For example, when the second device is still, the second device sends still-state information of the second device to the first device, and when a motion status of the second device changes, the second device sends data of a motion sensor of the second device to the first device.

Further, referring to the schematic diagram of FIG. 9, locations of initial points of the first device and the second device are $P_0$ ($x_0,y_0$) and $W_0$ ($x_0,y0$) respectively, and the first device and the second device are in a BLUETOOTH connection. The first device creates a positioning coordinate system starting from the location $P_0$ ($x_0,y_0$). The positioning coordinate system uses a projection, on a horizontal plane, of a motion velocity direction of the first device at the location $P_0$ ($x_0,y_0$) as a positive direction of a Y-direction, sets an arrow, on the horizontal plane, perpendicular to the Y-direction as a positive direction of an X-direction, and uses an up arrow, at the location of $P_0$ ($x_0,y_0$), orthogonal to the X-direction and the Y-direction as a positive direction of a Z-direction. In addition, an included angle θ between the Y-direction and a due north direction is recorded. While creating the positioning coordinate system, the first device starts recording data of a motion sensor (a 3-axis acceleration sensor, a 3-axis gyroscope, and a 3-axis geomagnetic sensor) of the first device. The second device determines a motion status of the second device according to a built-in acceleration sensor. When the second device is in a still state, the second device periodically sends, to the first device by means of BLUETOOTH, information indicating that the second device is in the still state. During a period when the first device moves from $P_0$ ($x_0,y_0$) to $P_3$ ($x_3,y_3$), the second device remains in the still state, that is, the second device is located at $W_0$.

Step 302: The first device obtains, according to coordinate values of the first device in a positioning coordinate system at multiple moments within the first time segment and positioning parameter values of the second device at the multiple moments, a coordinate value of the still-state second device in the positioning coordinate system.

In step 301 and step 302, the first device is in the moving state, and the second state is in the still state. A coordinate value of the first device and a positioning parameter value of the second device may be used to obtain the coordinate value of the still-state second device.

Further, referring to the schematic diagram in FIG. 9, the first device calculates, according to the recorded data of the motion sensor, a moving track of the first device from the point $P_0$ ($x_0,y_0$) to the point $P_3$ ($x_3,y_3$) in the positioning coordinate system, determines a coordinate value of the first device at any moment in the positioning coordinate system, and records an RSSI for receiving a BLUETOOTH signal of the second device by the first device. The first device may calculate a coordinate value of the second device in the positioning coordinate system according to location coordinates and RSSIs obtained at multiple times. As shown in FIG. 9, the first device may obtain, by means of calculation, a location coordinate value $W_0$ of the second device according to the location coordinates $P_0$ $(x_0,y_0)$, $P_1$ $(x_1,y_1)$, $P_2$ $(x_2,y_2)$, and $P_3$ $(x_3,y_3)$ and corresponding RSSIs ($rssi_0$, $rssi_1$, $rssi_2$, and $rssi_3$).

Then, the second device starts moving, that is, both the first device and the second device are in the moving state, and step 303 is performed.

Step 303: After the first time segment, the second device starts moving, and the first device obtains a moving track of the moving-state second device in the positioning coordinate system according to a moving track shape of the moving-state second device, coordinate values of the first device at multiple moments in a motion process of the second device, and positioning parameter values of the second device at the multiple moments in the motion process of the second device.

The first device is in the moving state, and the second device is still, and then, both the first device and the second device move. When both the first device and the second device are in the moving state, for a specific implementation of obtaining the moving track of the second device, refer to the description of the embodiment shown in FIG. 5 or FIG. 7. Details are not described again herein.

Figure 10:
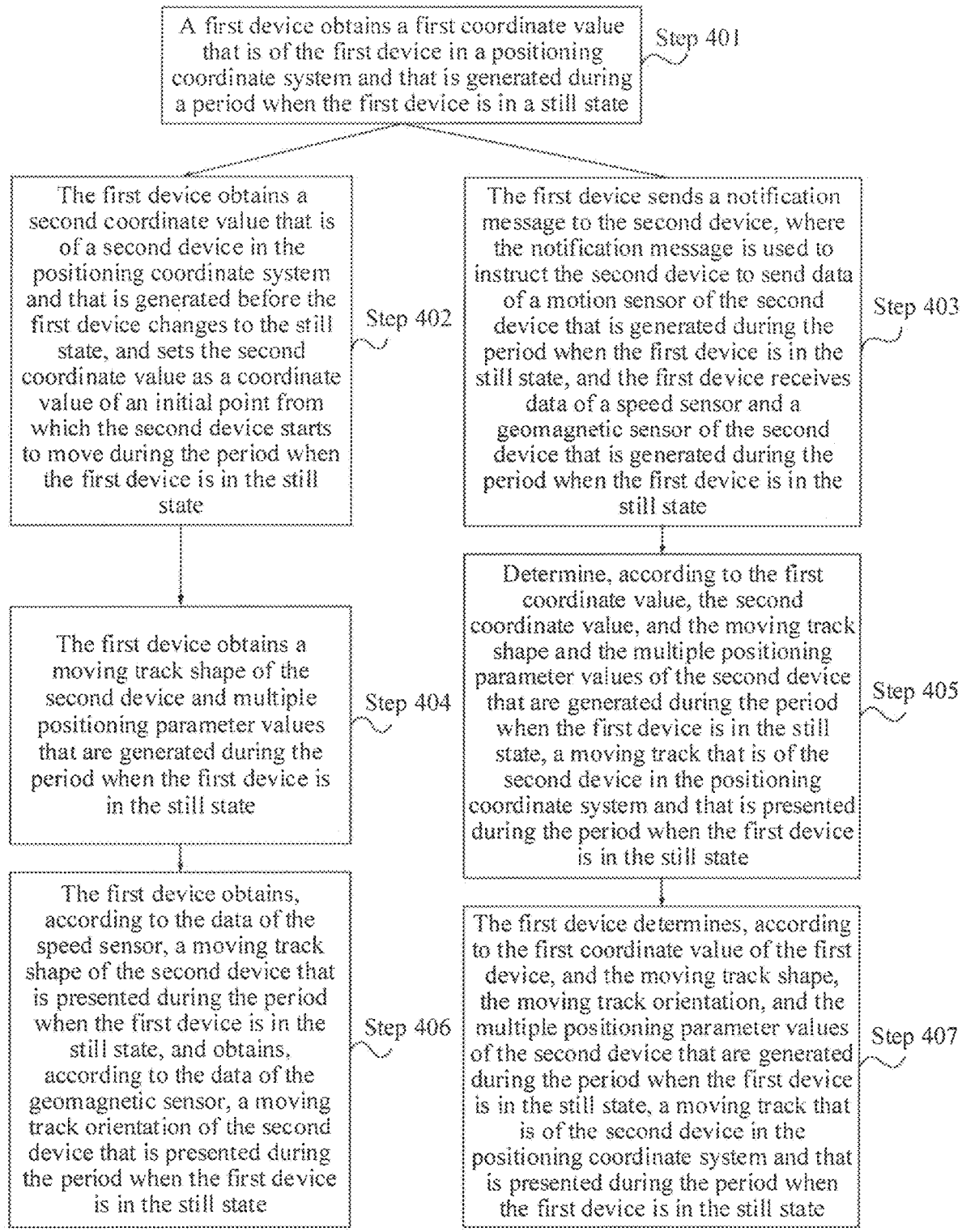
FIG. 10 is a flowchart of Embodiment 3 of the present disclosure.

Further, referring to the schematic diagram in FIG. 9, when the first device passes through a critical point in FIG. 9, the second device starts moving from $W_0$. In this case, the second device may determine, using the acceleration sensor of the second device, that the second device is in the moving state, and the second device reports, to the first device by means of BLUETOOTH, information indicating the moving state and data of a motion sensor (the acceleration sensor and an angular velocity sensor). After learning that the second device starts moving, the first device changes a positioning policy immediately. That is, starting from the critical point, the first device calculates a moving track and a location of the first device according to the data collected by the motion sensor (the acceleration sensor, the angular velocity sensor, and the geomagnetic sensor) of the first device, and calculates a track shape of the second device according to received data of the angular velocity sensor (the speed sensor and the angular velocity sensor) of the second device, and records RSSIs ($rssi_4$, $rssi_5$, and $rssi_6$) for receiving a BLUETOOTH signal of the second device by the first device each time. As shown in FIG. 10, starting from the critical point, the first device passes through $P_4$ $(x_4,y_4)$, $P_5$ $(x_5,y_5)$, and $P_6$ $(x_6,y_6)$, and the second device passes through $W_4$, $W_5$, and $W_6$ at the same time. An absolute moving track, including three elements, of the second device in the positioning coordinate system may be obtained, by means of calculation, according to the location coordinates ($P_4$ $(x_4,y_4)$, $P_5$ $(x_5,y_5)$, and $P_6$ $(x_6,y_6)$) of the first device, and a calculated moving track shape of the second device, and RSSIs ($rssi_4$, $rssi_5$, and $rssi_6$) recorded by the first device at the locations such that a coordinate value of the second device at any moment is determined.

Step 304: The first device obtains a corrected moving track of the second device in the positioning coordinate system according to a coordinate value of the still-state second device in the positioning coordinate system and the moving track of the moving-state second device in the positioning coordinate system.

Further, the moving track of the moving-state second device may be determined using step 303. Then, in combination with the coordinate value of the still-state second device determined in step 301 and step 302, the moving track may be corrected such that precision of the obtained moving track of the second device is improved.

Further, referring to the schematic diagram in FIG. 9, before the second device moves, the first device has already obtained, by means of calculation, the location coordinate value $W_0$ of the initial point of the second device. After the location coordinate value $W_0$ of the initial point is used for the positioning calculation for the second device, precision of the moving track of the second device and positioning the second device can be further improved. Similarly, if the second device reports the data of the motion sensor (the acceleration sensor, the angular velocity sensor, and the geomagnetic sensor) of the second device, moving track orientation information of the second device is added. If this information is used for the calculation process of positioning the second device, precision of the moving track and positioning precision of the second device can also be improved.

In this embodiment, the first device determines the coordinate value of the second device that is generated during the period when the second device is in the still state before moving, may use the coordinate value of the still-state second device to correct the moving track, and obtain the corrected moving track. In this way, the precision of the moving track of the second device can be effectively improved, and precise positioning is implemented.

In the embodiment in FIG. 6 or FIG. 7, both the first device and the second device are in the moving state. In the embodiment in FIG. 8, the first device moves and the second device is still. Certainly, in an actual positioning process, a case in which the first device is still and the second device moves exists. Based on the foregoing embodiment, positioning the second device when the first device is still and the second device moves is described with reference to FIG. 10.

FIG. 10 is a flowchart according to Embodiment 3 of the present disclosure. An implementation scenario of this embodiment is that a first device changes from a moving state to a still state. As shown in FIG. 10, the method may include the following steps.

Step 401: The first device obtains a first coordinate value that is of the first device in a positioning coordinate system and that is generated during a period when the first device is in the still state.

After step 401 is performed, step 402 or step 403 is performed. Step 402 or step 403 is an alternative implementation.

Step 402: The first device obtains a second coordinate value that is of the second device in the positioning coordinate system and that is generated before the first device changes to the still state, and sets the second coordinate value as a coordinate value of an initial point from which the second device starts to move during the period when the first device is in the still state.

After step 402 is performed, steps 404 and 406 are performed.

Alternatively, step 403: The first device sends a notification message to the second device, where the notification message is used to instruct the second device to send data of a motion sensor of the second device that is generated during the period when the first device is in the still state, and the first device receives data of a speed sensor and a geomagnetic sensor of the second device that is generated during the period when the first device is in the still state and that is sent by the second device.

After step 403 is performed, steps 405 and 407 are performed.

Step 404: The first device obtains a moving track shape of the second device and multiple positioning parameter values that are generated during the period when the first device is in the still state.

Step 405: Determine, according to the first coordinate value, the second coordinate value, and the moving track shape and the multiple positioning parameter values of the second device that are generated during the period when the first device is in the still state, a moving track that is of the second device in the positioning coordinate system and that is presented during the period when the first device is in the still state.

Step 406: The first device obtains, according to the data of the speed sensor, a moving track shape of the second device that is presented during the period when the first device is in the still state, and obtains, according to the data of the geomagnetic sensor, a moving track orientation of the second device that is presented during the period when the first device is in the still state.

Step 407: The first device determines, according to the first coordinate value of the first device, and the moving track shape, the moving track orientation, and the multiple positioning parameter values of the second device that are generated during the period when the first device is in the still state, a moving track that is of the second device in the positioning coordinate system and that is presented during the period when the first device is in the still state.

The data of the speed sensor includes a timestamp, and data of an acceleration sensor and an angular velocity sensor of the second device that is generated at a moment corresponding to the timestamp. The data of the geomagnetic sensor includes a timestamp, and data of the geomagnetic sensor of the second device that is generated at a moment corresponding to the timestamp.

For a specific implementation of step 404 to step 407, refer to the positioning method principle in the foregoing embodiments.

Figure 11:
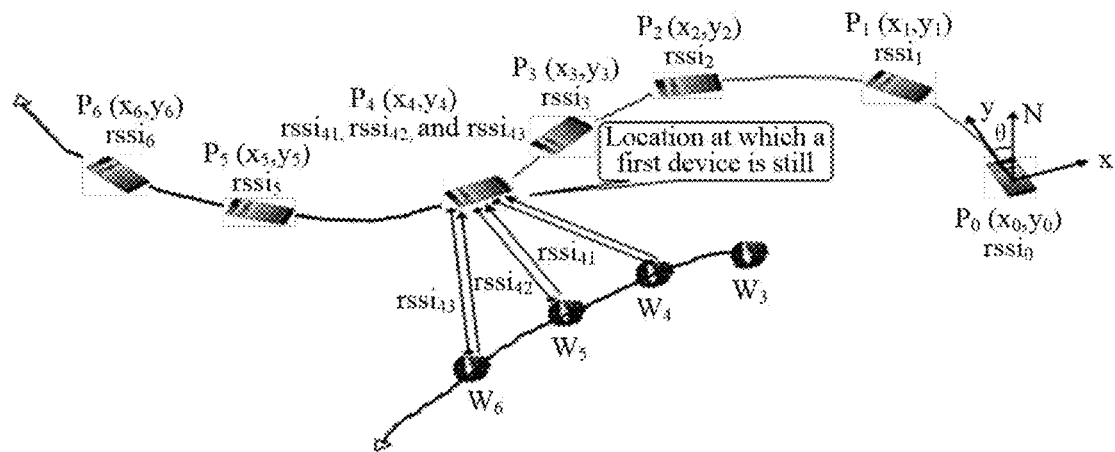
FIG. 11 is a schematic diagram of Embodiment 3 of the present disclosure.

Further, refer to a schematic diagram of the embodiment shown in FIG. 11. FIG. 11 is the schematic diagram of Embodiment 3 of the present disclosure. As shown in FIG. 11, the first device stays for a period after moving to the point $P_4$ ($x_4, y_4$). During this period, the second device moves from the point $W_4$ to $W_6$. In this case, the first device may instruct the second device to report the data of the motion sensor (the acceleration sensor, the angular velocity sensor, and the geomagnetic sensor). The first device determines, by means of calculation, the moving track shape and the moving track orientation of the second device according to the data of the motion sensor of the second device. The first device may determine, by means of calculation, the moving track of the second device according to the location $P_4$ ($x_4, y_4$) of the first device, RSSIs ($rssi_{41}$, $rssi_{42}$, and $rssi_{43}$) at different moments, and the moving track shape and the moving track orientation of the second device. Optionally, before reaching the stay point $P_4$ ($x_4, y_4$), the first device has already determined the moving track or the location $W_3$ of the second device, and may use $W_3$ ($x_3, y_3$) as the location of the initial point. The first device needs to instruct the second device to report only data of the speed sensor (the acceleration sensor and the angular velocity sensor) to calculate the moving track shape of the second device, and then may also determine the moving track of the second device according to the location $P_4$ ($x_4, y_4$) of the first device, the RSSIs ($rssi_{41}$, $rssi_{42}$, and $rssi_{43}$) at different moments, the moving track shape of the second device, and the location $W_3$ of the initial point of the second device. Optionally, if the first device obtains both the location $W_3$ of the second device and the data of the motion sensor (the acceleration sensor, the angular velocity sensor, and the geomagnetic sensor) of the second device, calculation precision of the moving track of the second device can be further improved, thereby improving positioning precision.

In this embodiment, the first device obtains a coordinate value of the second device that is generated before the first device changes to the still state, sets the coordinate value of the second device as the coordinate value of the initial point from which the second device starts to move during the period when the first device is still, and determines, according to the first coordinate value of the first device, the coordinate value of the initial point, and the moving track shape and the positioning parameter value of the second device that are generated during the period when the first device is in the still state, the moving track that is of the second device in the positioning coordinate system and that is presented during the period when the first device is in the still state in order to position the second device. Alternatively, the first device receives the data of the motion sensor that is sent by the second device, obtains the moving track shape and the moving track orientation of the second device that are presented during the period when the first device is in the still state, and obtains, according to the first coordinate value of the first device, and the moving track shape, the moving track orientation, and the positioning parameter value of the second device that are generated during the period when the first device is in the still state, the moving track that is of the second device in the positioning coordinate system and that is presented during the period when the first device is in the still state in order to position the second device.

Figure 12:
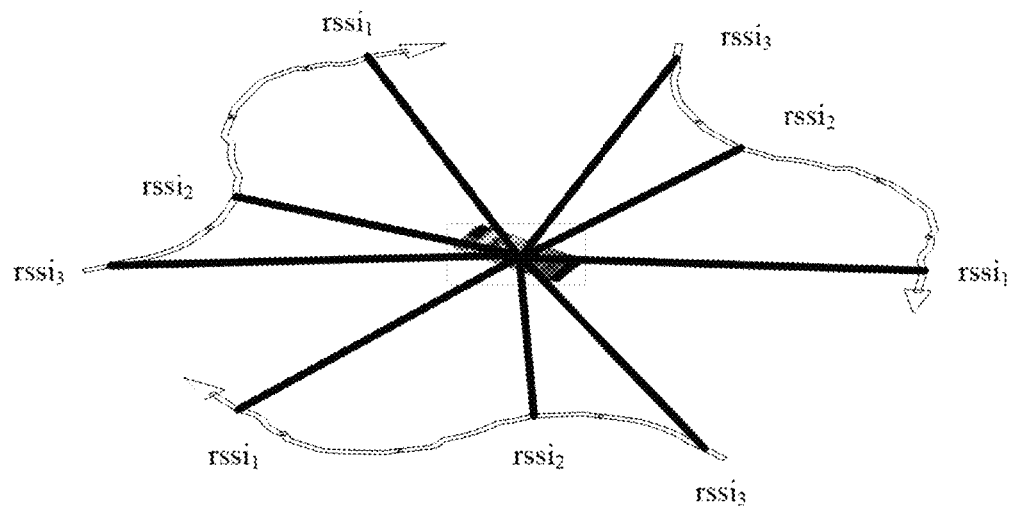
FIG. 12 is a principle diagram for calculating a moving track of a second device that is presented during a period when a first device is in a still state.

FIG. 12 is a principle diagram for calculating the moving track of the second device that is presented during the period when the first device is in the still state. It can be learned from the description of the embodiment shown in FIG. 10 and FIG. 11 that, during the period when the first device is in the still state, at least two of the three elements of the moving track need to be obtained such that the moving track of the second device can be uniquely determined. As shown in FIG. 12, if only the moving track shape of the second device and the positioning parameter value of the second device are obtained, more than one moving track of the second device meets the foregoing constraint condition, and the moving track of the second device cannot be determined. As shown in FIG. 12, three moving tracks meet the foregoing constraint condition. Therefore, in the positioning implementation process in the embodiment shown in FIG. 10 and FIG. 11, during the period when the first device is in the still state, at least two elements of the three elements of the moving track need to be obtained such that the moving track of the second device can be uniquely determined.

In the foregoing embodiment, positioning the second device is implemented based on a case in which a wireless communication connection is established between the first device and the second device. The following embodiment describes in detail positioning the second device in a case in which the wireless communication connection between a first device and the second device is broken.

The positioning method of this embodiment can be further used to position the second device in a case in which the wireless communication connection between the first device and the second device is broken. Details are provided according to the embodiment shown in FIG. 13.

Figure 13:
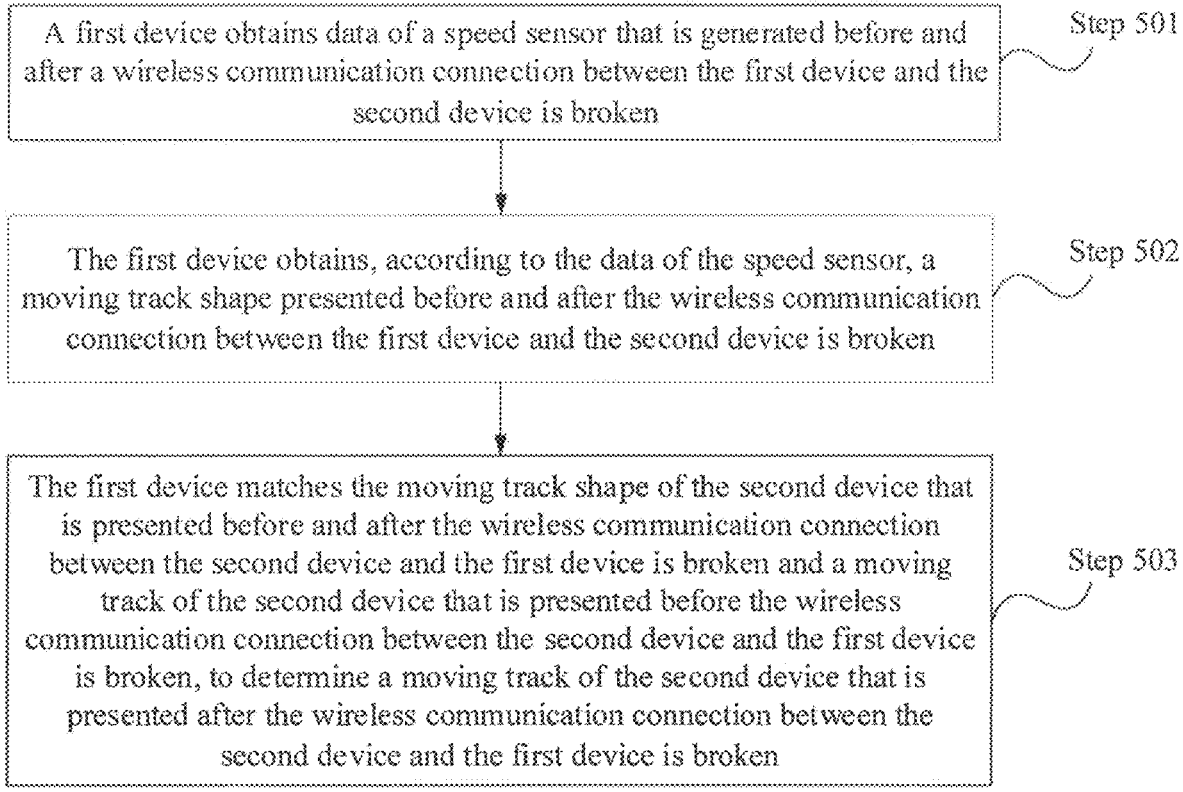
FIG. 13 is a flowchart of Embodiment 4 of the present disclosure.
Figure 14:
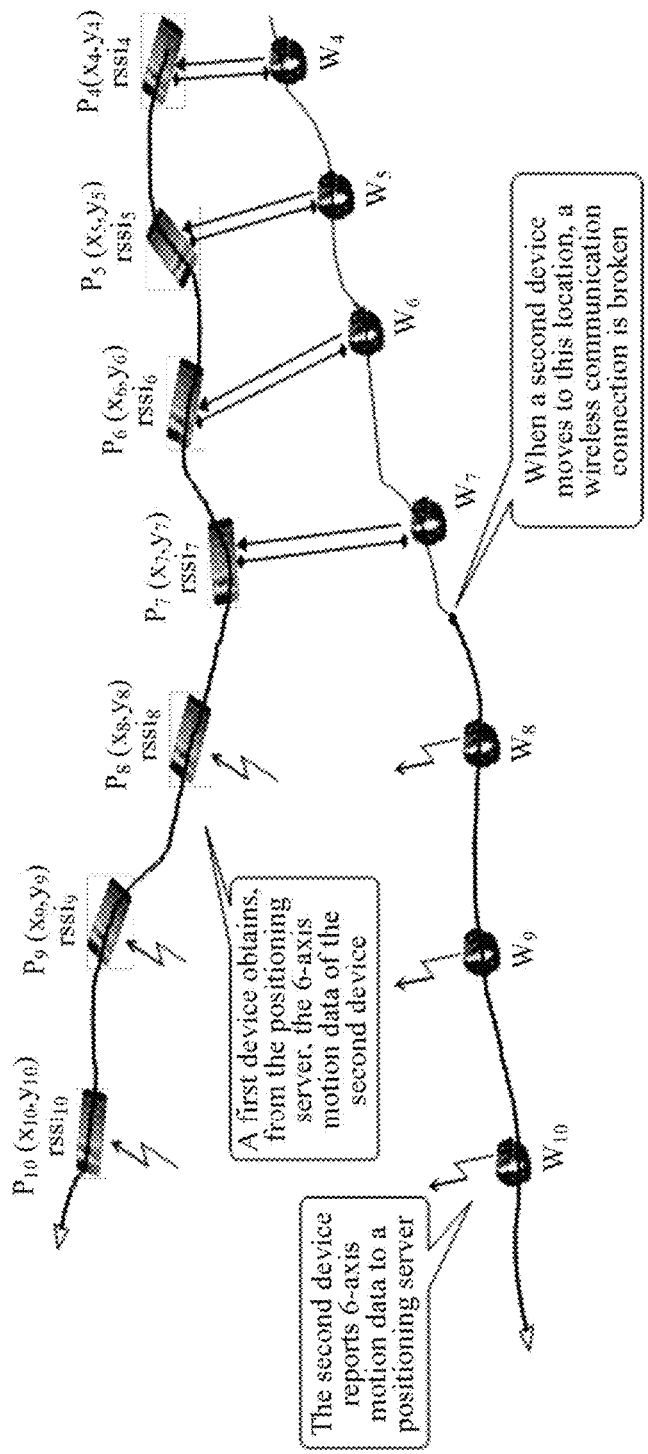
FIG. 14 is a schematic diagram of a positioning method used when a second device is in a moving state before and after a wireless communication connection is broken according to embodiments of the present disclosure.
Figure 15:
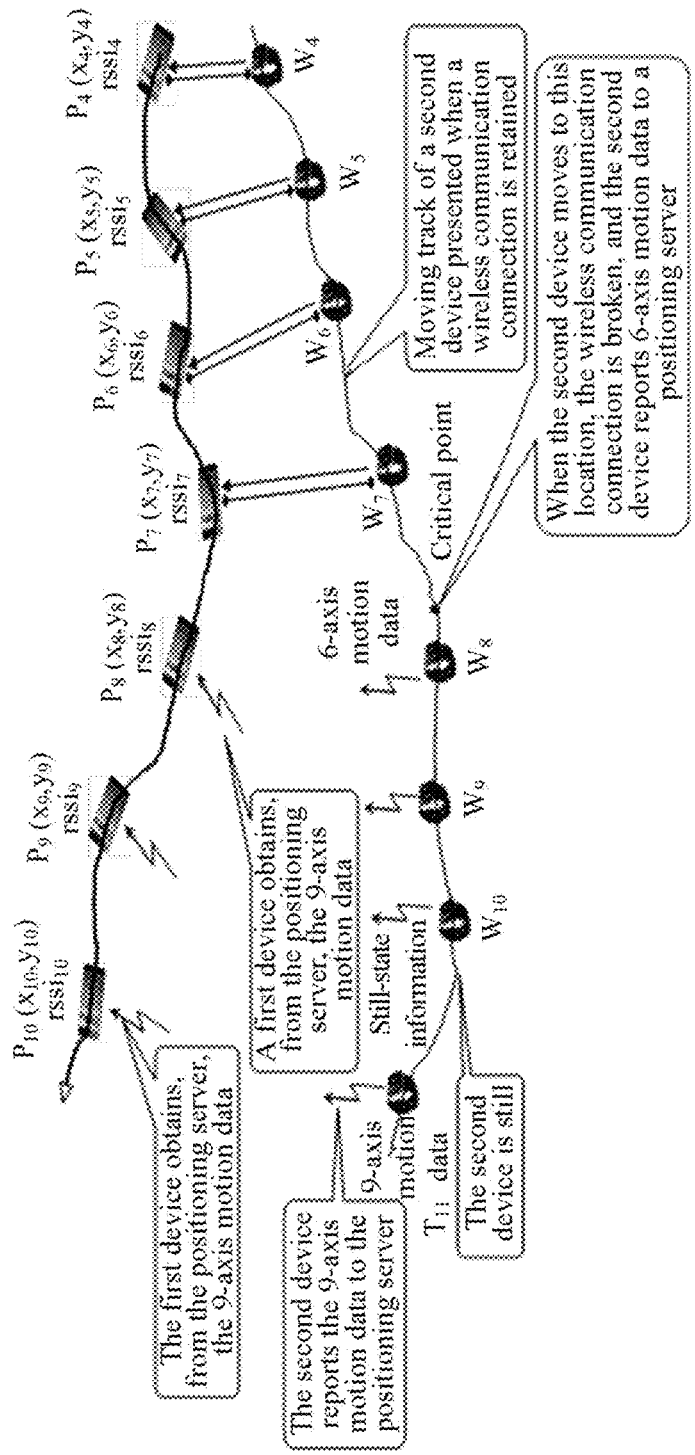
FIG. 15 is a schematic diagram of a positioning method used when a second device is in a moving state before and after a wireless communication connection is broken and when the second device is in a still state in a motion process after the wireless communication connection is broken according to embodiments of the present disclosure.

FIG. 13 is a flowchart of Embodiment 4 of the present disclosure. FIG. 14 is a schematic diagram of a positioning method used when a second device is in a moving state before and after a wireless communication connection is broken according to the embodiments of the present disclosure. FIG. 15 is a schematic diagram of a positioning method used when the second device is in the moving state before and after the wireless communication connection is broken and when the second device is in a still state in a motion process after the wireless communication connection is broken according to the embodiments of the present disclosure. An implementation scenario of this embodiment is that the second device is in the moving state before and after the wireless communication connection between a first device and the second device is broken. As shown in FIG. 13, a method of this implementation may include the following steps.

Step S501: The first device obtains data of a speed sensor that is generated before and after the wireless communication connection between the first device and the second device is broken.

The data of the speed sensor includes a timestamp, and data of an acceleration sensor and an angular velocity sensor of the second device that is generated at a moment corresponding to the timestamp. Step S501 is performed to position the second device after the wireless communication connection between the first device and the second device is broken. Further, before the wireless communication connection between the first device and the second device is broken, the first device and the second device are in a wireless communication connection state.

Further, the first device may obtain, from a positioning server, the data of the speed sensor of the second device. It may be understood that, after the wireless communication connection between the first device and the second device is broken, the first device and the second device may send, to the positioning server using a cellular network, data of the angular velocity sensors of the first device and the second device obtained at each moment. When the first device needs to position the second device, the first device may obtain, from the positioning server, the data of the speed data of the second device.

In another possible implementation, the first device and the second may perform communication using a WI-FI hotspot. That is, the first device may obtain, from the WI-FI hotspot, the data of the speed sensor that is sent by the second device. The first device may obtain data of the speed sensor of the second device that is generated at multiple moments before and after the wireless communication connection between the first device and the second device is broken.

Step 502: The first device obtains, according to the data of the speed sensor, a moving track shape presented before and after the wireless communication connection between the first device and the second device is broken.

Further, the first device combines data of the speed sensor that is generated before and after the wireless communication connection between the first device and the second device is broken, and calculates the moving track shape of the second device that is presented before and after the wireless communication connection is broken.

Step 503: The first device matches the moving track shape of the second device that is presented before and after the wireless communication connection between the second device and the first device is broken and a moving track of the second device that is presented before the wireless communication connection between the second device and the first device is broken to determine a moving track of the second device that is presented after the wireless communication connection between the second device and the first device is broken.

The moving track of the second device that is presented before the wireless communication connection between the second device and the first device is broken includes a coordinate value at each moment.

The second device is in the moving state before and after the wireless communication connection between the second device and the first device is broken. Both the moving track of the second device that is presented before the wireless communication connection between the second device and the first device is broken and the moving track of the second device that is presented after the wireless communication connection between the second device and the first device is broken are moving tracks in one positioning coordinate system.

Further, the first device matches the moving track shape of the second device that is presented before and after the wireless communication connection between the second device and the first device is broken and the moving track of the second device presented when the wireless communication connection between the second device and the first device is established to determine the moving track of the second device that is presented after the wireless communication connection is broken. Certainly, it may be understood that, another manner may be used to obtain the moving track of the second device that is presented before the wireless communication connection is broken. That the moving track of the second device is obtained when the wireless communication connection between the first device and the second device is established is not construed as limitation herein.

After the moving track of the second device that is presented after the wireless communication connection between the first device and the second device is broken is determined, a coordinate value of the second device at any moment after the wireless communication connection is broken may be determined.

For further description, refer to FIG. 14. An implementation scenario of this embodiment is that the second device remains in the moving state before and after the wireless communication connection between the first device and the second device is broken. As shown in FIG. 14, when the first device is between $P_4$ $(x_4,y_4)$ and $P_7$ $(x_7,y_7)$, and the second device is between $W_4$ and $W_7$, the wireless communication connection between the first device and the second device is established. Then, when the first device is between $P_8$ $(x_8,y_8)$ and $P_{10}$ $(x_{10},y_{10})$, and the second device is between $W_8$ and $W_{10}$, the wireless communication connection between the first device and the second device is broken. The second device sends data obtained by a motion sensor (an acceleration sensor, an angular velocity sensor, and a geomagnetic sensor) of the second device to a positioning server. The first device may obtain, from the positioning server, the data of the motion sensor of the second device. During a period when the wireless communication connection between the first device and the second device is established, the first device may determine, by means of calculation, the moving track of the second device in the positioning coordinate system using the method of the embodiment shown in FIG. 5. After the wireless communication connection between the first device and the second device is broken, the second device reports, using a cellular network, the data of the motion sensor to the positioning server, and the first device downloads, from the positioning server, the data of the motion sensor of the second device. As shown in FIG.

13, the second device constantly moves before and after the wireless communication connection is broken. After the wireless communication connection is broken, the second device needs to report only data of the speed sensor (the acceleration sensor and the angular velocity sensor) to the positioning server. After obtaining, using the positioning server, the data of the speed sensor of the second device that is generated after the wireless communication connection is broken, the first device may determine, by means of calculation, using the following method, the moving track of the second device that is presented after the wireless communication connection is broken. The first device combines data of the speed sensor of the second device that is generated before and after the wireless communication connection is broken, and determines, by means of calculation, the moving track shape of the second device that is presented before and after the wireless communication connection is broken, after the moving track shape of the second device that is presented before and after the wireless communication connection is broken are obtained, the first device matches the moving track shape and a moving track, pre-determined by means of calculation, of the second device that is presented before the wireless communication connection is broken, and after the matching is completed, the moving track of the second device that is presented after the wireless communication connection is broken is determined accordingly. In this way, after the wireless communication connection between the first device and the second device is broken, positioning the second device can still be implemented. In addition, in the positioning implementation process, data of the motion sensor does not need to be obtained, effectively reducing network data transmission traffic and device energy consumption.

Optionally, after the first device matches the moving track shape of the second device that is presented before and after the wireless communication connection between the first device and the second device is broken and the moving track of the second device that is presented before the wireless communication connection between the first device and the second device is broken to determine the moving track of the second device that is presented after the wireless communication connection between the first device and the second device is broken, that is, after step 503, the method may further include determining, by the first device, whether the second device moves again after being still for a period, if the second device moves again after being still for a period, obtaining, by the first device, a coordinate value of the second device that is generated during the period when the second device is in the still state, and obtaining data of the speed sensor and the geomagnetic sensor of the second device that is generated after the second device moves again from the still state, obtaining, by the first device according to the data of the speed sensor, a moving track shape of the second device that is presented after the second device moves again from the still state, and obtaining, according to the data of the geomagnetic sensor, a moving track orientation of the second device that is presented after the second device moves again from the still state, and obtaining, by the first device according to the coordinate value of the second device that is generated during the period when the second device is in the still state, and the moving track shape and the moving track orientation of the second device that are presented after the second device moves again from the still state, the moving track that is of the second device in the positioning coordinate system and that is presented after the second device moves again from the still state.

That is, after the wireless communication connection between the first device and the second device is broken, if the second device has ever been in the still state, the data of the motion sensor (the acceleration sensor, the angular velocity sensor, and the geomagnetic sensor) of the second device needs to be obtained for subsequent positioning.

Further, refer to the schematic diagram in FIG. 15. The second device is in the moving state before and after the wireless communication connection between the first device and the second device is broken. However, the second device has ever been still in a motion process after the wireless communication connection between the first device and the second device is broken. As shown in FIG. 15, when the first device is between $P_4$ $(x_4,y_4)$ and $P_7$ $(x_7,y_7)$, and the second device is between $W_4$ and $W_7$, the wireless communication connection is established between the first device and the second device. Then, the wireless communication connection between the first device and the second device is broken. That is, when the first device is between $P_8$ $(x_8,y_8)$ and $P_{10}$ $(x_{10},y_{10})$, and the second device is between $W_8$ and $W_{10}$, the wireless communication connection between the first device and the second device is broken. After the wireless communication connection is broken, the second device moves to $W_{10}$ and then is still, and then starts moving again at $T_{11}$. After the wireless communication connection is broken, the second device sends the data obtained by the speed sensor of the second device to the positioning server, and the first device may obtain, from the positioning server, the data of the motion sensor of the second device. Before and after the wireless communication connection is broken, the second device constantly moves from $W_4$ to $W_{10}$. According to the foregoing solution, after the wireless communication connection is broken, the second device reports only the data of the speed sensor (or the motion sensor), and moving track calculation and positioning can be implemented. However, after the wireless communication connection is broken, the second device moves for a period, and then moves again after being still for a period (being still after moving to $W_{10}$). It can be learned from FIG. 15 that, after $W_{10}$, a big change occurs on a track of the second device, such as at $T_{11}$. Therefore, it is difficult to determine the moving track orientation of the second device according to only the data of the speed sensor. Therefore, data of the motion sensor needs to be reported when the second device moves again after being still (after $W_{10}$) such that a moving track and a location of the second device that moves again after being still can be determined. In this way, after the wireless communication connection is broken, and the second device continues to move after being still for a period, the first device can still determine the moving track of the second device using the data of the motion sensor of the second device in order to position the second device. This eliminates a positioning difficulty caused by an undetermined factor.

According to this embodiment, the first device obtains the data of the speed sensor of the second device, obtains, according to the data of the speed sensor, the moving track shape of the second device that is presented before and after the wireless communication connection is broken, and matches the moving track shape of the second device that is presented before and after the wireless communication connection is broken and the moving track of the second device that is presented before the wireless communication connection is broken to determine the moving track of the second device that is presented after the wireless communication connection is broken in order to position the second device. In addition, positioning the second device can be implemented by obtaining only the data of the speed sensor from the positioning server. This can effectively reduce network traffic and device energy consumption.

Figure 17:
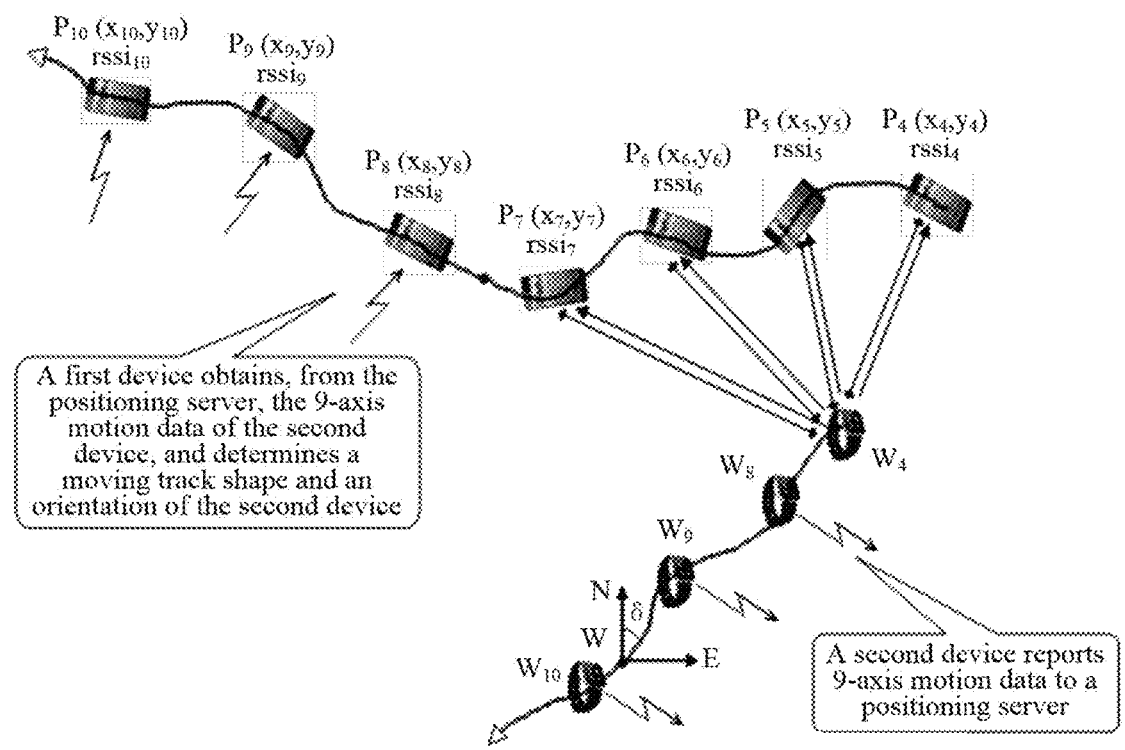
FIG. 17 is a schematic diagram of a positioning method used when a second device is still before a wireless communication connection is broken and when the second device moves after the wireless communication connection is broken according to embodiments of the present disclosure.

FIG. 16 is a flowchart of Embodiment 5 of the present disclosure. An application scenario of this embodiment is that a second device is still before a wireless communication connection between a first device and the second device is broken, and the second device moves after the wireless communication connection between the first device and the second device is broken. FIG. 17 is a schematic diagram of a positioning method used when the second device is still before the wireless communication connection is broken and when the second device moves after the wireless communication connection is broken according to the embodiments of the present disclosure. As shown in FIG. 16, the method of this embodiment may include the following steps.

Step 601: If the first device determines that the second device is in a still state before the wireless communication connection between the first device and the second device is broken, and the first device determines that the second device is in a moving state after the wireless communication connection between the first device and the second device is broken, the first device obtains a coordinate value of the still-state second device that is generated before the wireless communication connection between the first device and the second device is broken.

Step 602: The first device obtains data of a speed sensor and a geomagnetic sensor of the second device that is generated after the wireless communication connection between the second device and the first device is broken.

Step 603: The first device obtains, according to the data of the speed sensor, a moving track shape of the second device that is presented after the wireless communication connection between the second device and the first device is broken, and obtains, according to the data of the geomagnetic sensor, a moving track orientation presented after the wireless communication connection between the second device and the first device is broken.

Step 604: The first device determines a moving track of the second device in the positioning coordinate system according to the coordinate value of the still-state second device that is generated before the wireless communication connection between the second device and the first device is broken, and the moving track shape and the moving track orientation of the second device that are presented after the wireless communication connection between the second device and the first device is broken.

That is, if before the wireless communication connection between the second device and the first device is broken, the second device is in the still state, and after the wireless communication connection between the second device and the first device is broken, the second device starts moving, the data of the motion sensor (an acceleration sensor, an angular velocity sensor, and the geomagnetic sensor) of the second device needs to be obtained for positioning the second device in the case in which the wireless communication connection is broken.

Further, refer to FIG. 17. As shown in FIG. 17, the wireless communication connection between the first device and the second device is established when the first device is between $P_4$ $(x_4,y_4)$ and $P_7$ $(x_7,y_7)$. During this period, the second device stays at $W_4$. Then, the wireless communication connection between the first device and the second device is broken. That is, when the first device is between $P_8$ $(x_8,y_8)$ and $P_{10}$ $(x_{10},y_{10})$, and the second device is between $W_8$ and $W_{10}$, the wireless communication connection between the first device and the second device is broken.

After the wireless communication connection is broken, the second device sends data obtained by the motion sensor of the second device to a positioning server, and the first device may obtain, from the positioning server, the data of the motion sensor of the second device. During the period when the wireless communication connection between the first device and the second device is maintained, the second device stays at $W_4$, and the second device may report still-state information to the first device. The first device calculates, according to data of a motion sensor of the first device, a moving track of the first device and positioning parameter values RSSIs, $rssi_4$, $rssi_5$, $rssi_6$, and $rssi_7$, at $P_4$ $(x_4,y_4)$, $P_5$ $(x_5,y_5)$, $P_6$ $(x_6,y_6)$, and $P_7$ $(x_7,y_7)$ between the first device and the second device, and obtains by means of calculation the still location $W_4$. Then, the wireless communication connection between the first device and the second device is broken, and the second device needs to report the data of the motion sensor to the positioning server. After downloading, from the positioning server, the data of the motion sensor of the second device that is generated after the wireless communication connection is broken, the first device may determine, by means of calculation, the moving track shape and the moving track orientation of the second device that are presented after the wireless communication connection is broken. Then, in combination with the still location $W_4$ of the second device, determined by means of calculation before the wireless communication connection is broken, the moving track of the second device that is presented after the wireless communication connection is broken may be obtained by means of calculation.

According to this embodiment, when the wireless communication connection between the first device and the second device is established, the first device obtains the still location of the second device. After the wireless communication connection is broken, the moving track of the second device can be determined using the data of the motion sensor of the second device and the still location such that positioning the second device can be implemented. This eliminates a positioning difficulty caused by an undetermined factor.

According to the description of the embodiments, the positioning method of the present disclosure can position the second device without the help of an infrastructure in both a case in which the wireless communication connection between the first device and the second device is established and a case in which the wireless communication connection is broken.

Figure 18B:
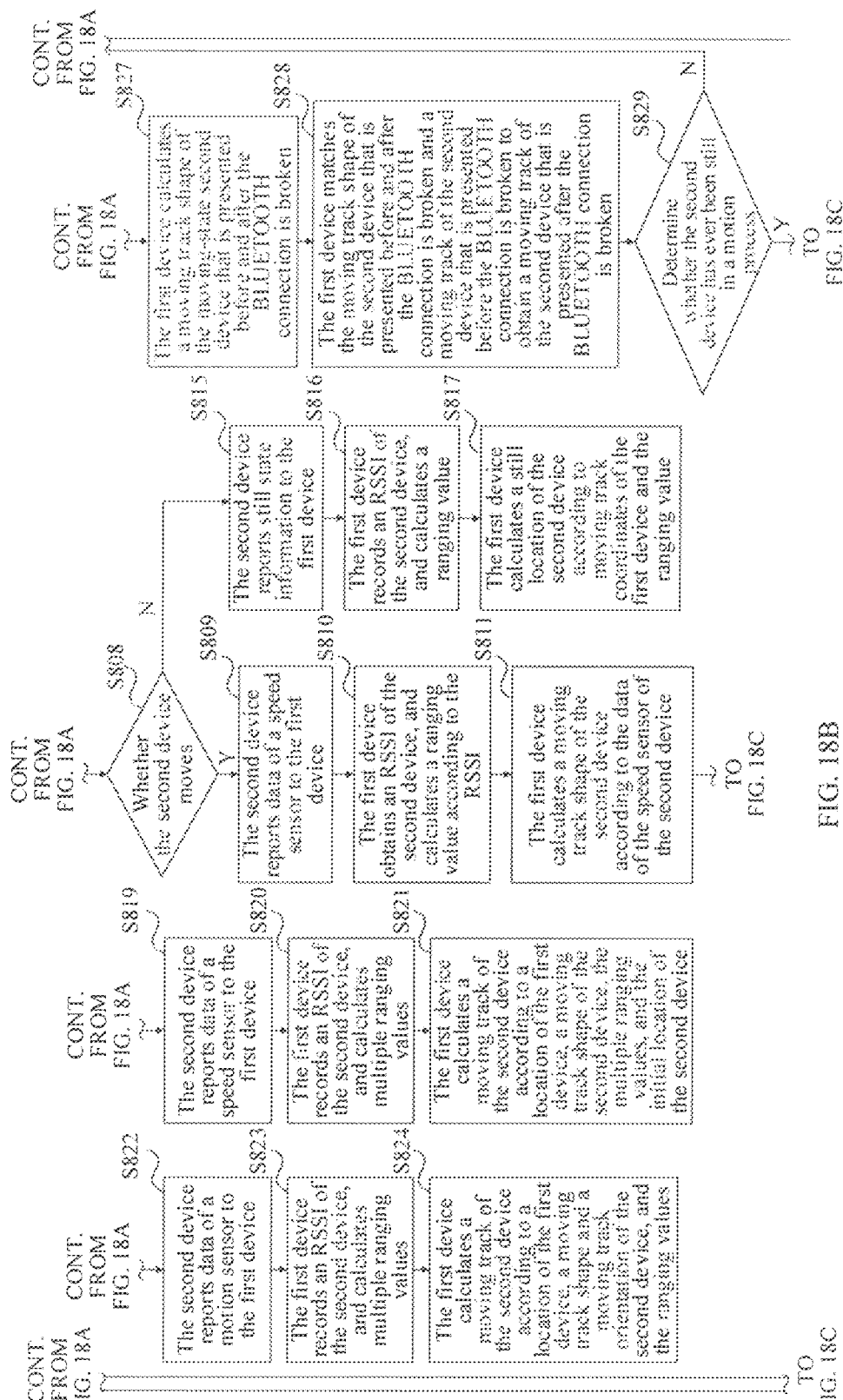
Figure 18C:
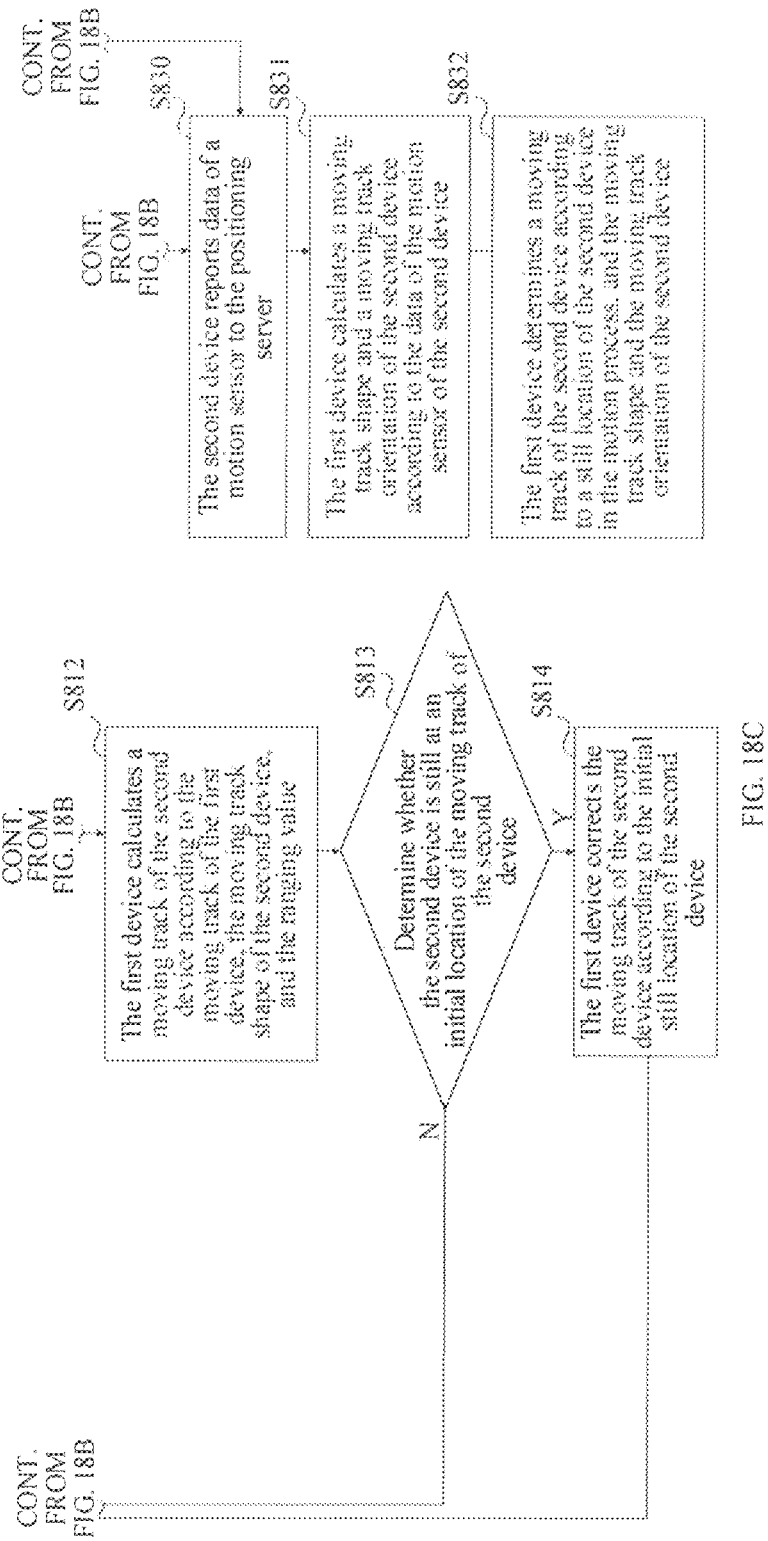

FIGS. 18A, 18B, and 18C are a flowchart of Embodiment 6 of the present disclosure. As shown in FIGS. 18A, 18B, and 18C, the method may include the following steps.

Step S801: A first device creates a positioning coordinate system.

Further, when positioning is triggered, the first device uses a current location of the first device as an origin of the positioning coordinate system, a projection of a current motion velocity direction of the first device on a horizontal plane as a positive direction of a Y-axis of the positioning coordinate system, a direction perpendicular to the positive direction of the Y-axis as a positive direction of an X-axis of the positioning coordinate system, and an upward direction orthogonal to the positive direction of the Y-axis and perpendicular to the positive direction of the Y-axis as a positive direction of a Z-axis of the positioning coordinate system. In addition, the first device records an included angle θ between the positive direction of the Y-axis and a due north direction.

Step S802: The first device calculates location coordinates and a moving track of the first device, and performs time synchronization with a second device.

Further, the first device obtains data of a motion sensor (an acceleration sensor, an angular velocity sensor, and a geomagnetic sensor) using the motion sensor of the first device, and may calculate the moving track and the location coordinates of the first device in the positioning coordinate system according to the data of the motion sensor. Time synchronization may be performed using a BLUETOOTH connection, or using a positioning server when no BLUETOOTH connection is available.

Step S803: The first device detects a BLUETOOTH connection between the first device and the second device.

Step S804: The first device determines whether the BLUETOOTH connection is retained between the first device and the second device. If the BLUETOOTH connection is retained between the first device and the second device, step S805 is performed, or if the BLUETOOTH connection is not maintained between the first device and the second device, step S825 is performed.

Step S805: The first device detects a motion status of the first device according to a motion sensor of the first device.

Step S806: The first device determines whether the first device moves, and if the first device moves, performs step S807, or if the first device does not move, performs step S818.

Step S807: The second device detects a motion status of the second device.

Step S808: Determine whether the second device moves, and if the second device moves, perform step S809, or if the second device does not move, perform step S815.

Step S809: The second device reports data of a speed sensor (an acceleration sensor and an angular velocity) to the first device.

Step S810: The first device obtains an RSSI of the second device, and calculates a ranging value according to the RSSI.

Step S811: The first device calculates a moving track shape of the second device according to the data of the speed sensor of the second device.

Step S812: The first device calculates a moving track of the second device according to the moving track of the first device, the moving track shape of the second device, and the ranging value.

Further, location coordinates of the first device at a point corresponding to the ranging value are further included.

A manner of piecewise fitting may be further used to calculate the moving track of the second device. For details, refer to the foregoing embodiment. Details are not described herein again.

Step S813: Determine whether the second device is still at an initial location of the moving track of the second device, and if the second device is still at the initial location, perform step S814, or if the second device is not still at the initial location, perform step S803.

Step S814: The first device corrects the moving track of the second device according to the initial still location of the second device.

Step S815: The second device reports still-state information to the first device.

Step S816: The first device records an RSSI of the second device, and calculates a ranging value.

Further, when the first device moves, and the second device is still, multiple ranging values are obtained by means of calculation.

Step S817: The first device calculates a still location of the second device according to moving track coordinates of the first device and the ranging values.

Step S818: Determine whether an initial location of the second device is determined, and if the initial location is determined, perform step S819, or if the initial location is not determined, perform step S822.

Step S819: The second device reports data of a speed sensor to the first device.

The first device calculates a moving track shape of the second device according to the data of the speed sensor.

Step S820: The first device records an RSSI of the second device, and calculates multiple ranging values.

Step S821: The first device calculates a moving track of the second device according to a location of the first device, a moving track shape of the second device, the multiple ranging values, and the initial location of the second device.

After step S821 is completed, step S803 may be performed.

Step S822: The second device reports data of a motion sensor to the first device.

The first device calculates a moving track shape and a moving track orientation of the second device according to the data of the motion sensor.

Step S823: The first device records an RSSI of the second device, and calculates multiple ranging values.

Step S824: The first device calculates a moving track of the second device according to a location of the first device, a moving track shape and a moving track orientation of the second device, and the ranging values.

After step S824 is completed, step S803 may be performed.

Step S825: Determine whether the second device moves before the BLUETOOTH connection is broken, and if the second device moves, perform S826, or if the second device does not move, perform S830.

Step S826: The second device reports data of a speed sensor to a positioning server.

Step S827: The first device calculates a moving track shape of the moving-state second device that is presented before and after the BLUETOOTH connection is broken.

Further, the first device obtains, from the positioning server, data of the speed sensor of the second device that is generated before and after the BLUETOOTH connection is broken, and calculates a moving track shape of the second device.

Step S828: The first device matches the moving track shape of the second device that is presented before and after the BLUETOOTH connection is broken and the moving track of the second device that is presented before the BLUETOOTH connection is broken to obtain a moving track of the second device that is presented after the BLUETOOTH connection is broken.

Step S829: Determine whether the second device has ever been still in a motion process, and if the second device has ever been still, perform step S830, or if the second device has not been still, perform step S826.

Step S830: The second device reports data of a motion sensor to the positioning server.

Step S831: The first device calculates a moving track shape and a moving track orientation of the second device according to the data of the motion sensor of the second device.

Step S832: The first device determines a moving track of the second device according to a still location of the second device in the motion process, and the moving track shape and the moving track orientation of the second device.

After step S832 is completed, step S803 may be performed.

It should be noted that, in the accompanying drawing, a 9-axis motion sensor may be understood as the motion sensor (the acceleration sensor, the angular velocity sensor, and the geomagnetic sensor), and a 6-axis motion sensor may be understood as the speed sensor (the acceleration sensor and the angular velocity sensor).

In this embodiment, whenever the BLUETOOTH connection between the first device and the second device is maintained or broken, positioning the second device can be implemented.

In conclusion, according to the positioning method of the present disclosure, positioning the second device can be implemented. The finally obtained moving track of the second device and location coordinates at each moment may be flexibly applied according to a requirement. For example, the first device may output the finally obtained moving track and the location coordinates to a user such that the user can obtain, from the first device, a location of the second device. Compared with other approaches that searching is performed manually depending on sound and light, the positioning method of the present disclosure can be used to position the second device that moves randomly. Therefore, a positioning effect is relatively desirable.

Figure 19:
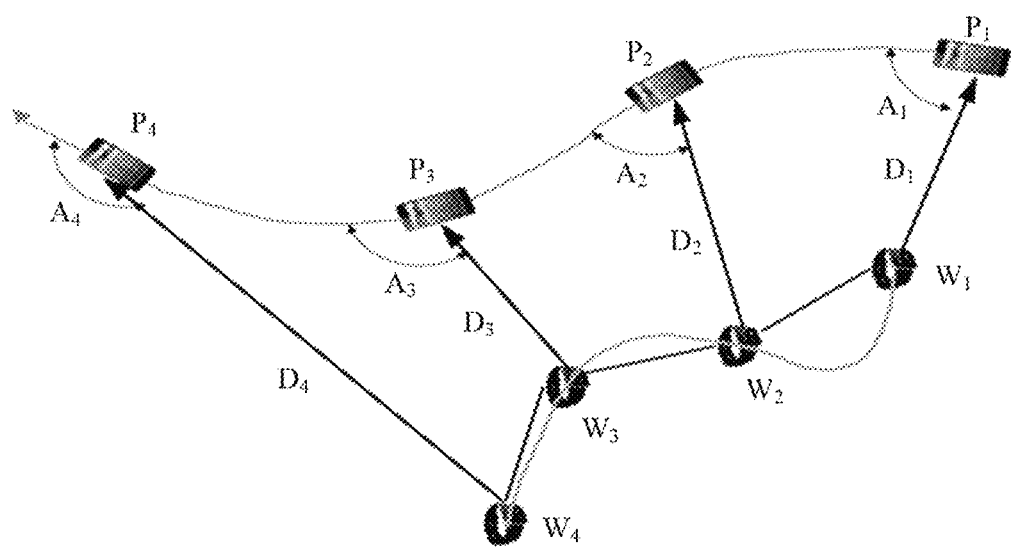
FIG. 19 is a schematic diagram for calculating a moving track of a second device using "distance+relative angle" as a constraint condition according to embodiments of the present disclosure.

Finally, it should be noted that in the embodiments of the present disclosure, a wireless communication connection RSSI of the second device that is received by the first device is used as a constraint condition, to obtain, by means of calculation, the moving track and the location of the second device. Theoretically, a parametric value available to implement the positioning method is not limited to the RSSI. All other parametric values such as a ranging value and a relative angle between the first device and the second device, or a combination thereof may be directly used as the constraint condition to calculate the moving track of the second device. FIG. 19 is a schematic diagram for calculating a moving track of the second device using "distance+ relative angle" as a constraint condition according to the embodiments of the present disclosure. As shown in FIG. 19, a distance (D) and a relative angle (A) may be further used in a positioning implementation process.

Figure 20:
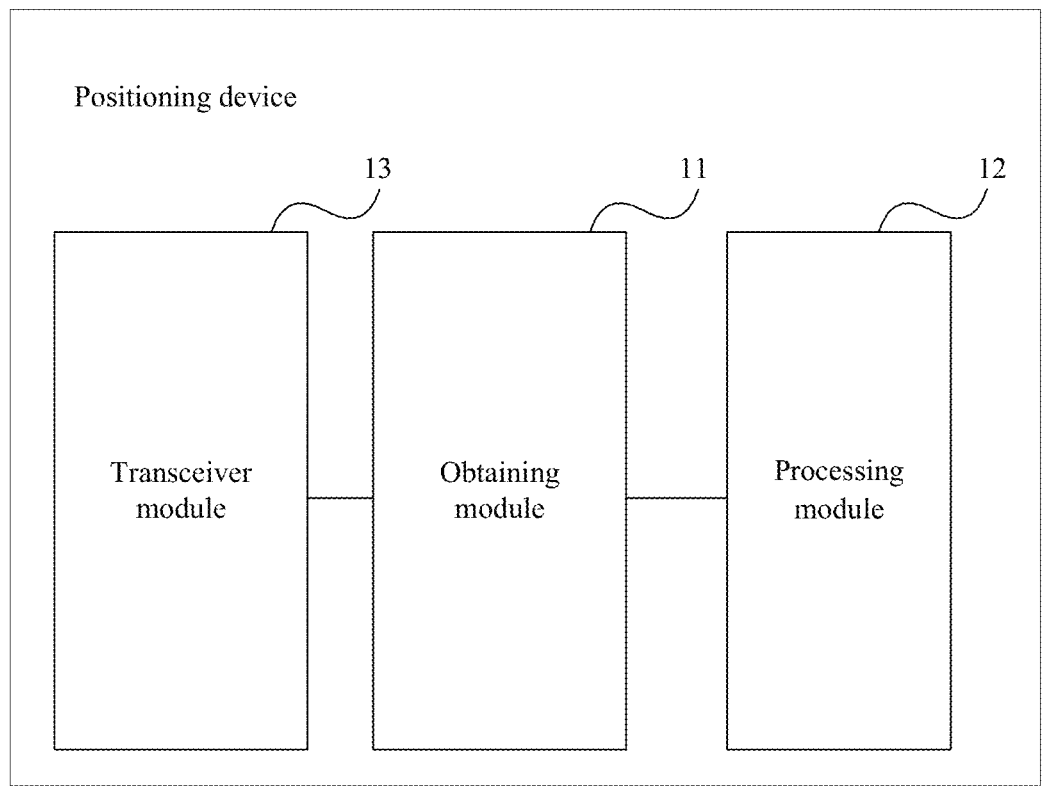
FIG. 20 is a schematic structural diagram of a positioning device according to an embodiment of the present disclosure.

FIG. 20 is a schematic structural diagram of a positioning device according to an embodiment of the present disclosure. As shown in FIG. 20, the positioning device of this embodiment may include an obtaining module 11 and a processing module 12. The processing module 12 is configured to create a positioning coordinate system. The obtaining module 11 is configured to obtain a moving track shape of a second device that is presented within preset duration, and obtain n pieces of positioning data generated within the preset duration. The positioning data includes a positioning parameter value of the second device and a coordinate value of the first device in the positioning coordinate system. The positioning parameter value includes at least one of an RSSI, a ranging value, or a relative angle. The processing module 12 is further configured to determine a moving track of the second device in the positioning coordinate system according to the obtained moving track shape of the second device and the obtained n pieces of positioning data. A wireless communication connection is established between the first device and the second device, and the first device and the second device are time-synchronized. The moving track of the second device in the positioning coordinate system includes a coordinate value that is of the second device in the positioning coordinate system and that is generated within the preset duration, and n is a natural number greater than 1.

In a possible implementation, that the obtaining module 11 is configured to obtain a moving track shape of a second device that is presented within preset duration includes the obtaining module 11 is configured to obtain data of a speed sensor of the second device that is generated within the preset duration, where the data of the speed sensor includes a timestamp, and data of an acceleration sensor and data of an angular velocity sensor that are generated at a moment corresponding to the timestamp, and obtain the moving track shape of the second device according to the data of the speed sensor.

Optionally, the obtaining module 11 is further configured to obtain data of a geomagnetic sensor of the second device that is generated within the preset duration. The data of the geomagnetic sensor includes a timestamp, and data of the geomagnetic sensor of the second device that is generated at a moment corresponding to the timestamp. Correspondingly, the processing module 12 is further configured to determine a corrected moving track of the second device in the positioning coordinate system according to the moving track of the second device in the positioning coordinate system and the data of the geomagnetic sensor. The corrected moving track includes a corrected coordinate value of the second device in the positioning coordinate system within the preset duration.

In another possible implementation, when obtaining a moving track shape of a second device, the obtaining module 11 is configured to obtain moving track shape information of the second device, and obtain, according to the moving track shape information, the moving track shape of the second device that is presented within the preset duration. The moving track shape information of the second device is determined by the second device according to data of a speed sensor of the second device. The data of the speed sensor includes a timestamp, and data of an acceleration sensor and an angular velocity sensor of the second device that is generated at a moment corresponding to the timestamp.

Optionally, the first device changes from a moving state to a still state. The obtaining module 11 is further configured to obtain a first coordinate value that is of the first device in the positioning coordinate system and that is generated during a period when the first device is in the still state, obtain a second coordinate value that is of the second device in the positioning coordinate system and that is generated before the first device changes to the still state, and set the second coordinate value as a coordinate value of an initial point from which the second device starts to move during the period when the first device is in the still state, and obtain a moving track shape and multiple positioning parameter values of the second device that are generated during the period when the first device is in the still state. The processing module 12 is further configured to determine, according to the first coordinate value of the first device, the second coordinate value, and the moving track shape and the multiple positioning parameter values of the second device that are generated during the period when the first device is in the still state, a moving track that is of the second device in the positioning coordinate system and that is presented during the period when the first device is in the still state.

Optionally, the first device changes from a moving state to a still state, and the obtaining module 11 is further configured to obtain a third coordinate value of the first device in the positioning coordinate system and multiple positioning parameter values of the second device that are generated during the period when the first device is in the still state.

The first device may further include a transceiver module 13. The transceiver module 13 is configured to send a notification message to the second device. The notification message is used to instruct the second device to send data of a motion sensor of the second device that is generated during the period when the first device is in the still state, and the data of the motion sensor includes the data of the speed sensor and the data of the geomagnetic sensor.

The transceiver module 13 is further configured to receive the data of the motion sensor that is sent by the second device.

The obtaining module 11 is further configured to obtain, according to the data of the speed sensor that is received by the transceiver module, a moving track shape of the second device that is presented during the period when the first device is in the still state, and obtain, according to the data of the geomagnetic sensor that is received by the transceiver module, a moving track orientation of the second device that is presented during the period when the first device is in the still state.

The processing module 12 is further configured to determine, according to the third coordinate value of the first device, and the moving track shape, the moving track orientation, and the multiple positioning parameter values of the second device that are generated during the period when the first device is in the still state, a moving track that is of the second device in the positioning coordinate system and that is presented during the period when the first device is in the still state.

The data of the speed sensor includes a timestamp, and data of the acceleration sensor and the angular velocity sensor of the second device that is generated at a moment corresponding to the timestamp. The data of the geomagnetic sensor includes a timestamp, and data of the geomagnetic sensor of the second device that is generated at a moment corresponding to the timestamp.

The first device of this embodiment may be configured to execute the technical solutions in the foregoing method embodiments. An implementation principle and a technical effect are similar to those in the method embodiments. Details are not described herein again.

Figure 21:
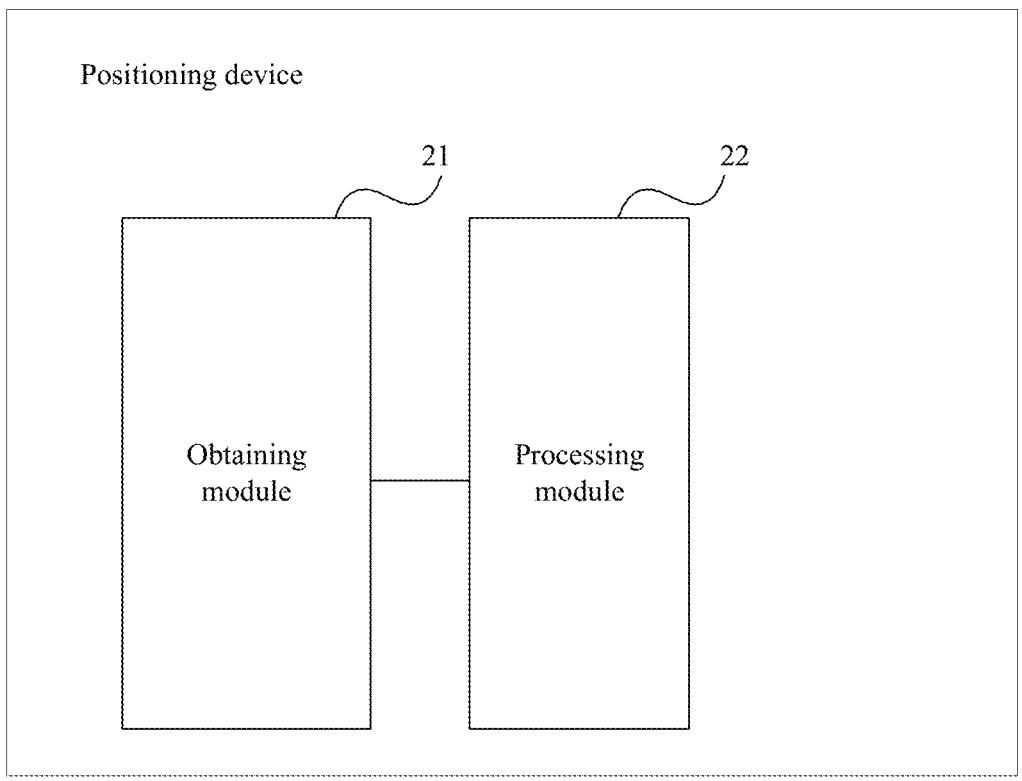
FIG. 21 is a schematic structural diagram of a positioning device according to an embodiment of the present disclosure.

FIG. 21 is a schematic structural diagram of a positioning device according to an embodiment of the present disclosure. As shown in FIG. 21, the positioning device in this embodiment may include an obtaining module 21 and a processing module 22. The obtaining module 21 is configured to obtain a moving track shape presented before and after a wireless communication connection between a second device and the first device is broken, and a moving track of the second device that is presented before the wireless communication connection between the second device and the first device is broken. The processing module 22 is configured to match the moving track shape of the second device that is presented before and after the wireless communication connection between the second device and the first device is broken and the moving track of the second device that is presented before the wireless communication connection between the second device and the first device is broken to determine a moving track of the second device that is presented after the wireless communication connection between the second device and the first device is broken. The second device is in a moving state, both the moving track of the second device that is presented before the wireless communication connection between the second device and the first device is broken and the moving track of the second device that is presented after the wireless communication connection between the second device and the first device is broken are moving tracks in one positioning coordinate system. The moving track includes a coordinate value of the second device in the positioning coordinate system.

Optionally, when obtaining a moving track shape presented before and after a wireless communication connection between a second device and the first device is broken, the obtaining module 21 is configured to obtain data of a speed sensor that is generated before and after the wireless communication connection between the second device and the first device is broken, and obtain, according to the data of the speed sensor that is generated before and after the wireless communication connection between the second device and the first device is broken, the moving track shape of the second device that is presented before and after the wireless communication connection between the second device and the first device is broken. The data of the speed sensor includes a timestamp, and data of an acceleration sensor and an angular velocity sensor of the second device that is generated at a moment corresponding to the timestamp.

Optionally, the processing module 22 is further configured to determine that the second device has ever been in a still state in a motion process after the wireless communication connection between the second device and the first device is broken. The obtaining module 21 is further configured to obtain a coordinate value of the second device that is generated during the period when the second device is in the still state, and obtain data of a speed sensor and a geomagnetic sensor of the moving-state second device, obtain a moving track shape of the moving-state second device according to the data of the speed sensor, and obtain a moving track orientation of the moving-state second device according to the data of the geomagnetic sensor, and determine a moving track of the second device in the positioning coordinate system according to the coordinate value of the second device that is generated during the period when the second device is in the still state, and the moving track shape and the moving track orientation of the moving-state second device.

The first device of this embodiment may be configured to execute the technical solutions in the foregoing method embodiments. An implementation principle and a technical effect are similar to those in the method embodiments. Details are not described herein again.

Figure 22:
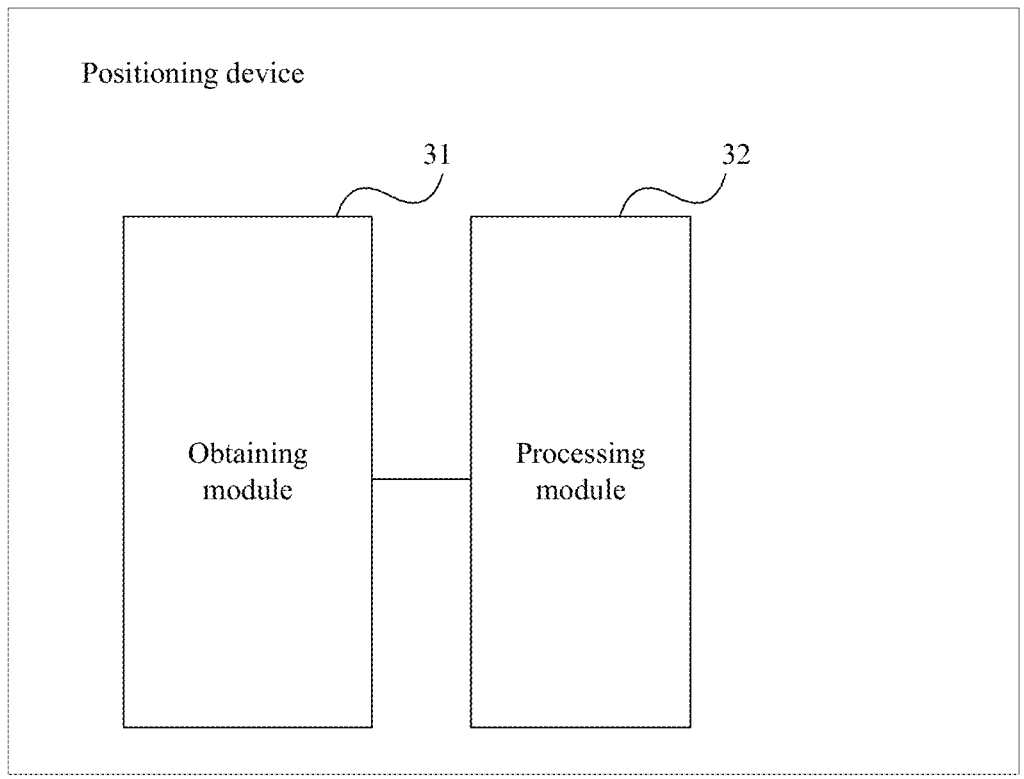
FIG. 22 is a schematic structural diagram of a positioning device according to an embodiment of the present disclosure.

FIG. 22 is a schematic structural diagram of a positioning device according to an embodiment of the present disclosure. As shown in FIG. 22, the positioning device of this embodiment may include an obtaining module 31 and a processing module 32. The obtaining module 31 is configured to, when a second device is in a still state before a wireless communication connection between the second device and the first device is broken, and the second device is in a moving state after the wireless communication connection between the second device and the first device is broken, obtain a first coordinate value of the still-state second device that is generated before the wireless communication connection between the second device and the first device is broken, obtain data of a speed sensor and data of a geomagnetic sensor that are generated after the wireless communication connection between the second device and the first device is broken, and obtain, according to the data of the speed sensor, a moving track shape presented after the wireless communication connection between the second device and the first device is broken, and obtain, according to the data of the geomagnetic sensor, a moving track orientation presented after the wireless communication connection between the second device and the first device is broken. The processing module 32 is configured to determine a moving track of the second device in the positioning coordinate system according to the first coordinate value, and the moving track shape and the moving track orientation that are presented after the wireless communication connection between the second device and the first device is broken.

The first device of this embodiment may be configured to execute the technical solutions in the foregoing method embodiments. An implementation principle and a technical effect are similar to those in the method embodiments. Details are not described herein again.

Figure 23:
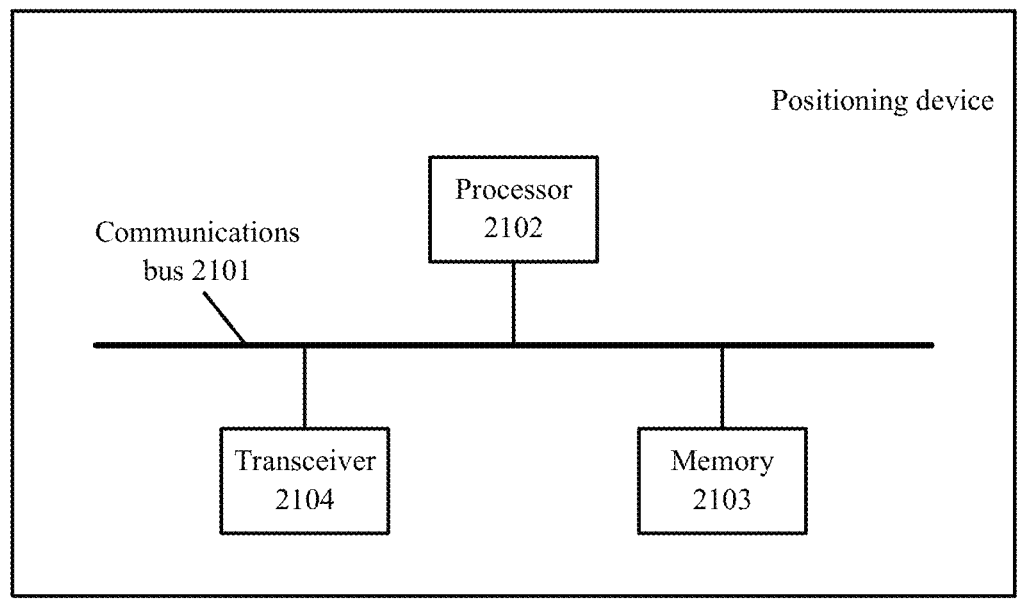
FIG. 23 is a schematic structural diagram of a positioning device according to an embodiment of the present disclosure.

FIG. 23 is a schematic structural diagram of a positioning device according to an embodiment of the present disclosure. As shown in FIG. 23, the positioning device of this embodiment may include a communications bus 2101, and at least one processor 2102 and a memory 2103 that are connected to the communications bus 2101. The communications bus 2101 is configured to implement connection communication between apparatuses. The processor 2102 may be a central processing unit (CPU), an application-specific integrated circuit (ASIC), one or more integrated circuits implementing this embodiment of the present disclosure, or a system on chip (SoC). The memory 2103 stores one or more programs, the one or more programs include an instruction, and when the instruction is executed by the first device, the first device executes the technical solution of the foregoing method embodiments. An implementation principle and a technical effect are similar to those in the method embodiments. Details are not described herein again. Optionally, the first device in this embodiment may further include a transceiver 2104. The processor 2102 may invoke instruction code in the memory 2103 to control the transceiver 2104 of this embodiment of the present disclosure to perform operations of the foregoing method embodiments. An implementation principle and a technical effect are similar to those in the method embodiments. Details are not described herein again.

In an implementation, the transceiver module 13 in the embodiment of the present disclosure may be corresponding to the transceiver 2104 of the first device. The obtaining module 11 and the processing module 12 may be corresponding to the processor 2102 of the first device.

In an implementation, the obtaining module 21 and the processing module 22 in the embodiment of the present disclosure may be corresponding to the processor 2102 of the first device.

In an implementation, the obtaining module 31 and the processing module 32 in the embodiment of the present disclosure may be corresponding to the processor 2102 of the first device.

In an implementation, the transceiver module 13 in the embodiment of the present disclosure may be understood as a transceiver, the obtaining module 11 may be understood as a detector, and the processing module 12 may be understood as a processor.

In an implementation, the obtaining module 21 of the embodiment of the present disclosure may be understood as a detector, and the processing module 22 may be understood as a processor.

In an implementation, the obtaining module 31 of the embodiment of the present disclosure may be understood as a detector, and the processing module 32 may be understood as a processor.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A positioning method, applied to a first device in a moving state, comprising:
obtaining, by a positioning server, a first moving track shape of a second device presented before and after a wireless communication coupling between the second device and the first device is broken;
obtaining a first moving track of the second device presented before the wireless communication coupling between the second device and the first device is broken;
matching the first moving track shape and the first moving track to determine a second moving track of the second device presented after the wireless communication coupling between the second device and the first device is broken, wherein the second device is in the moving state, wherein both the first moving track and the second moving track comprise moving tracks in a positioning coordinate system, and wherein each moving track comprises a first coordinate value of the second device in the positioning coordinate system; and
positioning the second device based on the second moving track of the second device.

2. The positioning method of claim 1, wherein obtaining the first moving track shape comprises:
obtaining first data of a speed sensor generated before and after the wireless communication coupling between the second device and the first device is broken, wherein the data of the speed sensor comprises a timestamp, and data of an acceleration sensor and an angular velocity sensor of the second device generated at a moment corresponding to the timestamp; and
obtaining, according to the first data, the first moving track shape.

3. The positioning method of claim 1, further comprising:
obtaining a second coordinate value of the second device generated during a period when the second device is in a still state, and obtaining data of a speed sensor and data of a geomagnetic sensor of the moving-state second device when the second device has ever been in the still state in a motion process after the wireless communication coupling between the second device and the first device is broken;
obtaining a second moving track shape of the moving-state second device according to the data of the speed sensor;

obtaining a moving track orientation of the moving-state second device according to the data of the geomagnetic sensor; and determining a moving track of the second device in the one positioning coordinate system according to the second coordinate value, the second moving track shape, and the moving track orientation of the moving-state second device.

4. The positioning method of claim 2, further comprising:
obtaining a second coordinate value of the second device generated during a period when the second device is in a still state, and obtaining second data of the speed sensor and data of a geomagnetic sensor of the moving-state second device when the second device has ever been in the still state in a motion process after the wireless communication coupling between the second device and the first device is broken;

obtaining a second moving track shape of the moving-state second device according to the second data;

obtaining a moving track orientation of the moving-state second device according to the data of the geomagnetic sensor; and determining a moving track of the second device in the one positioning coordinate system according to the second coordinate value, the second moving track shape, and the moving track orientation of the moving-state second device.

5. The positioning method of claim 1, wherein the first device comprises a smartphone, a smart band, a smartwatch, or a wearable device.

6. The positioning method of claim 1, wherein the second device comprises a smartphone, a smart band, a smartwatch, or a wearable device.

7. The positioning method of claim 1, wherein the wireless communication coupling comprises a BLUETOOTH communication coupling.

8. A first device in a moving state, comprising:
a memory comprising instructions; and
a processor coupled to the memory using a bus system, wherein the instructions cause the processor to be configured to:
obtain, by a positioning server, a first moving track shape of a second device presented before and after a wireless communication coupling between the second device and the first device is broken;
obtain a first moving track of the second device presented before the wireless communication coupling between the second device and the first device is broken;
match the first moving track shape and the first moving track to determine a second moving track of the second device presented after the wireless communication coupling between the second device and the first device is broken, wherein the second device is in the moving state, wherein both the first moving track and the second moving track comprise moving tracks in a positioning coordinate system, and wherein each moving track comprises a first coordinate value of the second device in the positioning coordinate system; and
position the second device based on the second moving track of the second device.

9. The first device of claim 8, wherein when obtaining the first moving track shape, the instructions further cause the processor to be configured to:
obtain first data of a speed sensor generated before and after the wireless communication coupling between the second device and the first device is broken, wherein the first data comprises a timestamp, and data of an acceleration sensor and an angular velocity sensor of the second device generated at a moment corresponding to the timestamp; and obtain, according to the first data, the first moving track shape.

10. The first device of claim 8, wherein the instructions further cause the processor to be configured to:
obtain a second coordinate value of the second device generated during a period when the second device is in a still state, and obtain data of a speed sensor and data of a geomagnetic sensor of the moving-state second device when the second device has ever been in the still state in a motion process after the wireless communication coupling between the second device and the first device is broken;

obtain a second moving track shape of the moving-state second device according to the data of the speed sensor;

obtain a moving track orientation of the moving-state second device according to the data of the geomagnetic sensor; and determine a moving track of the second device in the one positioning coordinate system according to the second coordinate value, the second moving track shape, and the moving track orientation of the moving-state second device.

11. The first device of claim 9, wherein the instructions further cause the processor to be configured to:
obtain a second coordinate value of the second device generated during a period when the second device is in a still state, and obtain second data of the speed sensor and data of a geomagnetic sensor of the moving-state second device when the second device has ever been in the still state in a motion process after the wireless communication coupling between the second device and the first device is broken;

obtain a second moving track shape of the moving-state second device according to the second data;

obtain a moving track orientation of the moving-state second device according to the data of the geomagnetic sensor; and determine a moving track of the second device in the positioning coordinate system according to the second coordinate value, the moving track shape, and the moving track orientation of the moving-state second device.

12. The first device of claim 8, wherein second device comprises a smartphone, a smart band, a smartwatch, or a wearable device.

13. The first device of claim 8, wherein the wireless communication coupling comprises a BLUETOOTH communication coupling.

14. A non-transitory computer readable storage medium storing one or more programs comprising an instruction, that when executed by a first device in a moving state, causes the first device to implement the following operations:
obtaining, by a positioning server, a first moving track shape of a second device presented before and after a wireless communication coupling between the second device and the first device is broken;

obtaining a first moving track of the second device presented before the wireless communication coupling between the second device and the first device is broken;

matching the first moving track shape and the first moving track to determine a second moving track of the second device presented after the wireless communication coupling between the second device and the first device is broken, wherein the second device is in the moving state, wherein both the first moving track and the second moving track comprise moving tracks in a positioning coordinate system, and wherein each a moving track comprises a first coordinate value of the second device in the positioning coordinate system; and positioning the second device based on the second moving track of the second device.

15. The non-transitory computer readable storage medium of claim 14, wherein when obtaining the first moving track shape, the instruction further causes the first device to implement the following operations:

obtaining first data of a speed sensor generated before and after the wireless communication coupling between the second device and the first device is broken, wherein the first data comprises a timestamp, and data of an acceleration sensor and an angular velocity sensor of the second device generated at a moment corresponding to the timestamp; and obtaining, according to the first data, the first moving track shape.

16. The non-transitory computer readable storage medium of claim 14, wherein the instruction further causes the first device to implement the following operations:

obtaining a second coordinate value of the second device generated during a period when the second device is in a still state, and obtaining data of a speed sensor and data of a geomagnetic sensor of the moving-state second device when the second device has ever been in the still state in a motion process after the wireless communication coupling between the second device and the first device is broken;

obtaining a second moving track shape of the moving-state second device according to the data of the speed sensor;

obtaining a moving track orientation of the moving-state second device according to the data of the geomagnetic sensor; and determining a moving track of the second device in the one positioning coordinate system according to the second coordinate value, the second moving track shape, and the moving track orientation of the moving-state second device.

17. The non-transitory computer readable storage medium of claim 16, wherein the instruction further causes the first device to implement the following operations:

obtaining a second coordinate value of the second device generated during a period when the second device is in a still state, and obtaining second data of the speed sensor and data of a geomagnetic sensor of the moving-state second device when the second device has ever been in the still state in a motion process after the wireless communication coupling between the second device and the first device is broken;

obtaining a second moving track shape of the moving-state second device according to the second data;

obtaining a moving track orientation of the moving-state second device according to the data of the geomagnetic sensor; and determining a moving track of the second device in the positioning coordinate system according to the second coordinate value, the moving track shape, and the moving track orientation of the moving-state second device.

18. The non-transitory computer readable storage medium of claim 14, wherein the first device comprises a smartphone, a smart band, a smartwatch, or a wearable device.

19. The non-transitory computer readable storage medium of claim 14, wherein the second device comprises a smartphone, a smart band, a smartwatch, or a wearable device.

20. The non-transitory computer readable storage medium of claim 14, wherein the wireless communication coupling comprises a BLUETOOTH communication coupling.

* * * * *

UNITED STATES PATENT AND TRADEMARK OFFICE
CERTIFICATE OF CORRECTION

PATENT NO. : 11,015,936 B2  
APPLICATION NO. : 15/771770  
DATED : May 25, 2021  
INVENTOR(S) : Xiaoping Zhang Page 1 of 1

It is certified that error appears in the above-identified patent and that said Letters Patent is hereby corrected as shown below:

In the Claims

Claim 3, Column 37, Line 5: "one positioning coordinate" should read "positioning coordinate"

Claim 10, Column 38, Line 24: "device in the one" should read "device in the"

Claim 14, Column 39, Line 6 and 7: "wherein each a moving" should read "wherein each moving"

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*